(12) United States Patent
Lachine

(10) Patent No.: US 12,354,249 B2
(45) Date of Patent: Jul. 8, 2025

(54) CHROMA CORRECTION OF INVERSE GAMUT MAPPING FOR STANDARD DYNAMIC RANGE TO HIGH DYNAMIC RANGE IMAGE CONVERSION

(71) Applicant: ATI TECHNOLOGIES ULC, Markham (CA)

(72) Inventor: Vladimir Lachine, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 647 days.

(21) Appl. No.: 17/485,736

(22) Filed: Sep. 27, 2021

(65) Prior Publication Data

US 2023/0095785 A1    Mar. 30, 2023

(51) Int. Cl.
*G06T 5/92* (2024.01)
*G06T 7/90* (2017.01)

(52) U.S. Cl.
CPC .......... *G06T 5/92* (2024.01); *G06T 7/90* (2017.01); *G06T 2207/20208* (2013.01)

(58) Field of Classification Search
CPC ... G06T 5/92; G06T 7/90; G06T 2207/20208; H04N 1/6058
See application file for complete search history.

(56) References Cited

U.S. PATENT DOCUMENTS

| | | | |
|---|---|---|---|
| 2017/0289555 A1* | 10/2017 | Su | H04N 19/14 |
| 2018/0007392 A1* | 1/2018 | Lasserre | H04N 19/186 |
| 2020/0013151 A1* | 1/2020 | Atkins | G06T 5/92 |
| 2022/0103720 A1* | 3/2022 | Thebault | H04N 1/6066 |

OTHER PUBLICATIONS

Akyuz, et al., "Do HDR displays support LDR content?", ACM Transactions on Graphics, vol. 26, pp. 38, Jul. 2007, ACM New York, NY.

International Telecommunication Union, "Recommendation ITU-R BT.2020, Parameter values for ultra-high definition television systems for production and international programme exchange", Aug. 2012, 7 pages, ITU. INT (online), URL: https://www.itu.int/dms_pubrec/itu-r/rec/bt/R-REC-BT.2020-0-201208-S!!PDF-E.pdf.

International Telecommunication Union, "Recommendation ITU-R BT.2100-2, Image parameter values for use in production and international programme exchange", Jul. 2018, 16pages, ITU.INT (online), URL: https://www.itu.int/dms_pubrec/itu-r/rec/bt/R-REC-BT.2100-2-201807-I!!PDF-E.pdf.

(Continued)

*Primary Examiner* — Ross Varndell

(57) ABSTRACT

Chroma correction of inverse gamut mapping (IGM) for standard dynamic range (SDR) to high dynamic range (HDR) image conversion includes: converting R,G,B color components in the RGB color format of a pixel of an image to an intensity component (I) and chroma components (Ct and Cp) of an ICtCp color format, wherein the R,G,B color components represent red, green, and blue colors; applying an intensity transformation operation on the intensity component (I) of the pixel; executing a chroma correction operation on the transformed intensity component (I) and the chroma components (Ct and Cp) of the pixel; and converting the intensity component (I) and the chroma components (Ct and Cp) of the pixel back to the RGB color format.

20 Claims, 13 Drawing Sheets

(56) References Cited

OTHER PUBLICATIONS

International Telecommunication Union, "Recommendation ITU-R BT.2390-7, High dynamic range television for production and international programme exchange", Jul. 2019, 59 pages, ITU.INT (online), URL: https://www.itu.int/dms_pub/itu-r/opb/rep/R-REP-BT.2390-7-2019-PDF-E.pdf.

International Telecommunication Union, "Recommendation ITU-R BT.709-6, Parameter values for the HDTV standards for production and international programme exchange", Jun. 2015, 19 pages, ITU.INT (online), URL: https://www.itu.int/dms_pubrec/itu-r/rec/bt/R-REC-BT.709-6-201506-I!!PDF-E.pdf.

Meylan et al., "The Reproduction of Specular Highlights on High Dynamic Range Displays", Color and Imaging Conference, Nov. 2006, pp. 333-338, vol. 2006, IS&T/SID (online), URL: https://infoscience.epfl.ch/record/85838?ln=en.

Mohammadi et al., "A High Contrast Video Inverse Tone Mapping Operator for High Dynamic Range Applications", IEEE International Symposium on Circuits and Systems (ISCAS), May 2019, Sapporo, Japan, pp. 1-5, IEEE Xplore Digital Library (online), [accessed Aug. 6, 2020], IEEE.org, ISBN: 978-1-7281-0397-6.

Rempel et al., "Ldr2Hdr: On-the-fly reverse tone mapping of legacy video and photographs", Proceedings of the ACM SIGGRAPH Conference on Computer Graphics (SCA07), Aug. 2007, 7 pages, ACM New York, NY.

\* cited by examiner

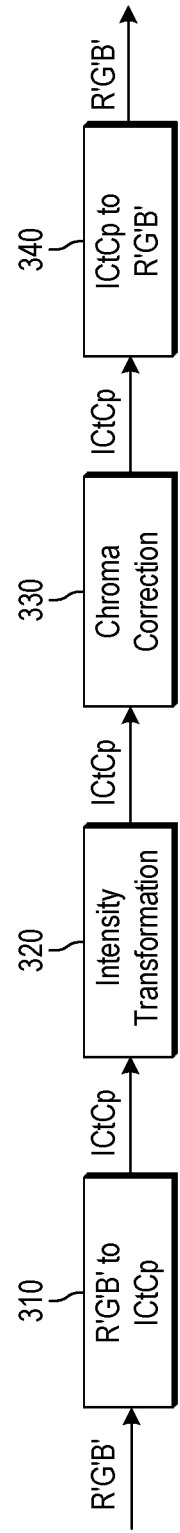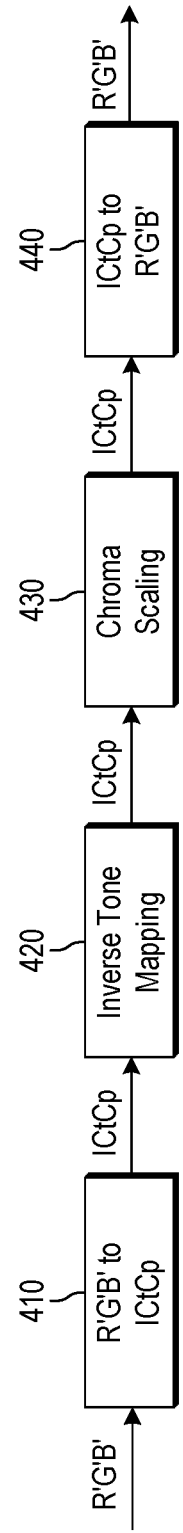
FIG. 3
FIG. 4

Convert $R,G,B$ Color Components In The $R,G,B$ Color Format Of A Pixel Of An Image To An Intensity Component ($I$) And Chroma Components ($Ct$ And $Cp$) In The $Ictcp$ Color Format, Wherein The $R,G,B$ Color Components Represent Red, Green, And Blue Colors
1610

Apply An Intensity Transformation Operation On The Intensity I Component Of The Pixel
1620

Execute A Chroma Correction Operation On The Transformed Intensity I Component And The Chroma Ct And Cp Components Of The Pixel
1630

Generate A Gamut Boundary Descriptor Using An Inverse Gamut Sampling Operation In A Constant Hue Plan By: Predicting A Gamut Boundary Point For An Elevation Angle From Radiuses Of A Plurality Of Gamut Boundary Points For A Plurality Of Previously Estimated Elevation Angles; And Refining The Gamut Boundary Point Along A Radius From A Middle Point Between A Maximum Intensity And A Minimum Intensity In The Constant Hue Plane Based Upon Testing The Gamut Boundary Point In RGB Color Coordinates
1810

Convert The Intensity I Component And The Chroma Ct And Cp Components Of The Pixel Back To The RGB Color Format
1640

FIG. 18

```
┌─────────────────────────────────────────────────────────────────┐
│ Convert R,G,B Color Components In The R,G,B Color Format Of A   │
│ Pixel Of An Image To An Intensity Component (I) And Chroma      │
│ Components (Ct And Cp) In The Ictcp Color Format, Wherein The   │
│ R,G,B Color Components Represent Red, Green, And Blue Colors    │
│                            1610                                  │
└─────────────────────────────────────────────────────────────────┘
                                 │
                                 ▼
┌─────────────────────────────────────────────────────────────────┐
│ Apply An Intensity Transformation Operation On The Transformed  │
│                  Intensity I Component Of The Pixel              │
│                              1620                                │
└─────────────────────────────────────────────────────────────────┘
                                 │
                                 ▼
┌─────────────────────────────────────────────────────────────────┐
│ Execute A Chroma Correction Operation On The Intensity I        │
│ Component And The Chroma Ct And Cp Components Of The Pixel      │
│                            1630                                  │
│  ┌───────────────────────────────────────────────────────────┐  │
│  │ Apply A Hue Rotation Operation To The Chroma Ct And Cp    │  │
│  │ Components Of The Pixel That Maps Red, Green, Blue, Cyan, │  │
│  │ Magenta, And Yellow Colors In A Source Gamut Into Similar │  │
│  │ Colors In A Destination Gamut By Rotating The Chroma Ct   │  │
│  │ And Cp Components In A Constant Intensity Plane           │  │
│  │                         1910                              │  │
│  └───────────────────────────────────────────────────────────┘  │
│  ┌───────────────────────────────────────────────────────────┐  │
│  │ Apply A Constant Hue Variable Origin Operation To The     │  │
│  │ Transformed Intensity I And The Chroma Ct And Cp          │  │
│  │ Components Of The Pixel That Maps In A Constant Hue Plane │  │
│  │ All Colors In Source Gamut Into A Destination Gamut Along │  │
│  │ A Constant Intensity Lines For Each Of The Colors Having  │  │
│  │ An Intensity Level Less Than An Intersection Of A Line    │  │
│  │ Between A Source Cusp Point And A Destination Cusp Point  │  │
│  │ With An Intensity Axis, And Along Lines Originated From   │  │
│  │ The Intersection For Each Of The Colors Having An         │  │
│  │ Intensity Level Greater Than The Intersection             │  │
│  │                         1920                              │  │
│  └───────────────────────────────────────────────────────────┘  │
└─────────────────────────────────────────────────────────────────┘
                                 │
                                 ▼
┌─────────────────────────────────────────────────────────────────┐
│ Convert The Intensity I Component And The Chroma Ct And Cp      │
│   Components Of The Pixel Back To The RGB Color Format          │
│                            1640                                  │
└─────────────────────────────────────────────────────────────────┘
```

FIG. 19

CHROMA CORRECTION OF INVERSE GAMUT MAPPING FOR STANDARD DYNAMIC RANGE TO HIGH DYNAMIC RANGE IMAGE CONVERSION

BACKGROUND

Image data, such as a video or a picture, can be displayed on a display device using a specific format compatible to the display device. A high dynamic range (HDR) and wide color gamut (HDR/WCG) format is used for displaying videos that have image data spanning a larger luminance and color range than a conventional standard dynamic range (SDR) and standard color gamut (SDR/SCG) format. An exemplary SCG relates to ITU-R BT.709 parameter values. An exemplary WCG relates to ITU-R BT.2020 parameter values. For example, HDR/WCG videos can provide an enhanced viewer experience and can more accurately reproduce scenes that include additional dark areas and bright highlights, such as emissive light sources and reflections. SDR/SCG videos include image data having a smaller luminance and color range than the HDR/WCG videos.

Due to modeling the behavior of Human Visual System (HVS) for perceiving brightness and color, HDR technology with Wide Color Gamut (WCG) offers a life-like viewing experience that is superior to what Standard Dynamic Range (SDR) with Standard Color Gamut (SCG) technology could achieve. Broadcasters and content owners have a huge library of SDR content and can continue producing real-time events in SDR format for the near future. In this case, SDR content needs to be converted to HDR format, taking advantage of the superior visual quality of HDR displays. Depending on a type of the display device, a conversion process of image data is performed for transitioning the image data into one of the HDR/WCG format and the SDR/SCG format. Conventional HDR/WCG converters are used to specifically meet HDR and WCG broadcast needs when rendering HDR/WCG content.

BRIEF DESCRIPTION OF THE DRAWINGS

FIG. 3 sets forth a diagram for providing chroma correction of IGM for SDR image with SCG to HDR image with WCG conversion for each pixel in an image in RGB color format in accordance with some implementations of the present disclosure FIG. 4 sets forth a diagram of conventional IGM in accordance with some implementations of the present disclosure.

FIG. 18 sets forth a flow chart illustrating an additional example method of chroma correction of IGM for SDR to HDR image conversion in accordance with some implementations of the present disclosure.

FIG. 19 sets forth a flow chart illustrating an additional example method of chroma correction of IGM for SDR to HDR image conversion in accordance with some implementations of the present disclosure.

DETAILED DESCRIPTION

Figure 1:
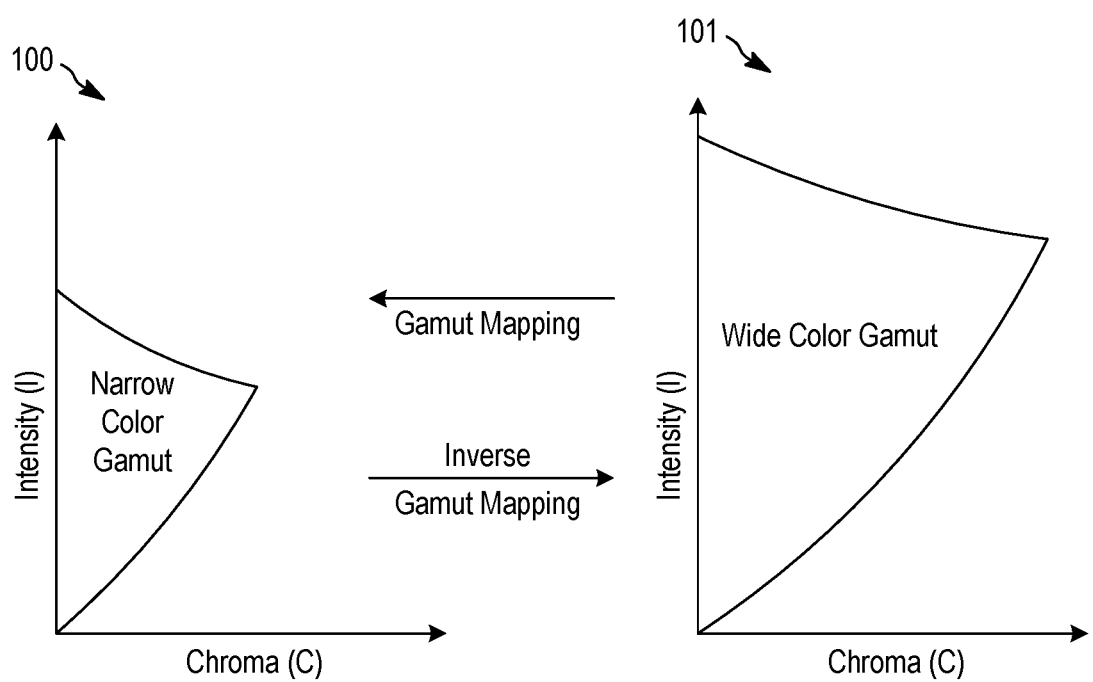
FIG. 1 sets forth a diagram of gamut reduction by gamut mapping and gamut expansion by inverse gamut mapping in chroma-intensity plane in accordance with some implementations of the present disclosure.

The present disclosure relates to color management in digital image data processing. More specifically, various chroma correction techniques are described and applied in inverse gamut mapping of SDR to HDR image conversion. Gamut is an entire range of colors available on a particular device (for example, a computer monitor). In some implementations, a gamut mapping operation can map or convert pixels of an image from one color gamut, such as a source gamut (e.g., HDR) to another color gamut (e.g., a destination gamut) that is more limited, such as a target (e.g., SDR color gamut). Also, a pixel within the color gamut of the image can include values indicating the color of the pixel such as, for example, the luminance, chroma, and hue values. In some implementations, gamut mapping maps out of gamut (non-displayable) R,G,B values of content with wide color gamut into displayable R,G,B values of monitor with narrower color gamut, i.e., this is gamut reduction operation. Inverse Gamut Mapping (IGM) procedure corrects content with narrow gamut for viewing on display with wider color gamut, i.e., this is a gamut expansion operation.

As mentioned above, the color gamut of an SDR image is referred to as SCG and the color gamut of an HDR image is referred to as WCG. The SCG chromaticity is defined by the International Telecommunication Union sector (ITU-R) BT.709 (e.g., parameter values for HDTV standards for production and international program exchange) and the peak luminance is 80 nits. WCG includes chromaticity ITU-R BT.2020 that is wider than ITU-R BT.709 and peak luminance is greater than 80 nits. Gamut Mapping is the process by which one color gamut is mapped to another. IGM as the term is used in this specification refers to a process by which a BT.709 gamut (SDR, SCG) is mapped into a BT.2020 gamut (HDR, WCG). This can be especially useful when an image generally includes pixels in the SDR gamut but will be displayed on an HDR capable display.

The design of SDR/SCG to HDR/WCG image conversion is a challenging task, as it tries to expand the brightness and color information to ranges that are not originally captured by SDR cameras. Attempts have been made to solve the problem by a process known as Inverse Tone Mapping (ITM) followed by chroma scaling (CS). However, there are many challenges in designing an efficient SDR/SCG to HDR/WCG conversion operation. For example, when brightness levels of SDR/SCG image content are expanded, noise in dark regions and banding in bright regions of the input SDR frame may be increased. Thus, keeping these visual artifacts at a non-perceivable level (e.g., by human detection) is an important consideration. Another challenge is that expansion of SDR/SCG brightness levels introduces changes in colors between an input SDR and generated HDR frames. Consequently, an efficient color adjustment operation is needed to maintain the color accuracy between input SDR and generated HDR frame.

To that end, an implementation is directed to a method of providing chroma correction of IGM for SDR to HDR image conversion. The method includes converting R,G,B color components in the RGB color format of a pixel of an image to an intensity component (I) and chroma components (Ct and Cp) of an $IC_TC_P$ color format, where the R,G,B color components represent red, green, and blue colors. The method also includes applying an intensity transformation operation on the intensity component (I) of the pixel, where the intensity component (I) is transformed. The method also includes executing a chroma correction operation on the intensity component (I) and the chroma components (Ct and Cp) of the pixel. The method also includes converting the intensity component (I) and the chroma components (Ct and Cp) of the pixel back to the RGB color format.

In some implementations, applying the intensity transformation operation also includes applying the intensity transformation operation further includes applying an inverse tone mapping operation and an opto-optical transfer function to the intensity component (I) of the pixel, and where applying the chroma correction operation to the $IC_TC_P$ color format includes applying a chroma scaling operation, a hue rotation operation, and a chroma mapping operation to the chroma components (Ct and Cp) of the pixel. In some implementations, applying the intensity transformation operation also includes applying an inverse tone mapping operation and an opto-optical transfer function to the intensity component (I) of the pixel, and where applying the chroma correction operation also includes applying a hue rotation operation to the chroma components (Ct and Cp) of the pixel and an inverse chroma mapping operation to the transformed intensity (I) and the rotated Ct and Cp components.

In some implementations, applying the chroma correction operation also includes generating a gamut boundary descriptor using an inverse gamut sampling operation in a constant hue plane by: predicting a gamut boundary point for an elevation angle from radiuses of a plurality of gamut boundary points for a plurality of previously estimated elevation angles; and refining the gamut boundary point along a radius from a middle point between maximum and minimum intensities to the predicted point in the constant hue plane based upon testing the gamut boundary point in R,G,B color coordinates.

In some implementations, applying the chroma correction operation also includes applying a hue rotation operation to the chroma components (Ct and Cp) of the pixel that maps red, green, blue, cyan, magenta, and yellow colors in a source gamut into similar colors in a destination gamut by rotating the chroma components (Ct and Cp) in a constant intensity plane.

In some implementations, applying the chroma mapping operation also includes applying a constant hue constant intensity mapping operation to the chroma components (Ct and Cp) of the pixel that maps in a constant hue plane all out of destination gamut chroma scaled source colors onto a destination gamut boundary surface along a constant intensity line.

In some implementations, applying the inverse chroma mapping operation also includes applying a constant hue variable origin operation to the transformed intensity (I) and the chroma components (Ct and Cp) of the pixel that maps in a constant hue plane all colors in source gamut into a destination gamut along a constant intensity line for each of the colors having an intensity level less than an intersection of a line between a source cusp point and a destination cusp point with an intensity axis, and along lines originated from the intersection for each of the colors having an intensity level greater than the intersection.

Another implementation is directed to an apparatus for providing chroma correction of IGM for SDR image with SCG to HDR image with WCG conversion for each pixel in an image in RGB color format. The apparatus comprises a computer processor, a computer memory operatively coupled to the computer processor, the computer memory having disposed therein computer program instructions that, when executed by the computer processor, cause the apparatus to convert R,G,B color components in the RGB color format of a pixel to an intensity component (I) and chroma components (Ct and Cp) of an ICtCp color format, where the R,G,B color components represent red, green, and blue colors. The computer program instructions also cause the apparatus to apply an intensity transformation operation on the intensity component (I) of the pixel, where the intensity component (I) is transformed. The computer program instructions also cause the apparatus to execute a chroma correction operation on the intensity component (I) and the chroma components (Ct and Cp) of the pixel. The computer program instructions also cause the apparatus to convert the intensity component (I) and the chroma components (Ct and Cp) of the pixel back to the RGB color format.

In some implementations, applying the intensity transformation operation also includes applying the intensity transformation operation further includes applying an inverse tone mapping operation and an opto-optical transfer function to the intensity component (I) of the pixel, and where applying the chroma correction operation to the $IC_TC_P$ color format includes applying a chroma scaling operation, a hue rotation operation, and a chroma mapping operation to the chroma components (Ct and Cp) of the pixel. In some implementations, applying the intensity transformation operation also includes applying an inverse tone mapping operation and an opto-optical transfer function to the intensity component (I) of the pixel, and where applying the chroma correction operation also includes applying a hue rotation operation to the chroma components (Ct and Cp) of the pixel and an inverse chroma mapping operation to the transformed intensity (I) and the Ct and Cp components.

In some implementations, applying the chroma correction operation also includes generating a gamut boundary descriptor using an inverse gamut sampling operation in a constant hue plane by: predicting a gamut boundary point for an elevation angle from radiuses of a plurality of gamut boundary points for a plurality of previously estimated elevation angles; and refining the gamut boundary point along a radius from a middle point between maximum and minimum intensities to the predicted point in the constant hue plane based upon testing the gamut boundary point in R,G,B color coordinates.

In some implementations, applying the chroma correction operation also includes applying a hue rotation operation to the chroma components (Ct and Cp) of the pixel that maps red, green, blue, cyan, magenta, and yellow colors in a source gamut into similar colors in a destination gamut by rotating the chroma components (Ct and Cp) in a constant intensity plane.

In some implementations, applying the chroma mapping operation also includes applying a constant hue constant intensity mapping operation to the chroma components (Ct and Cp) (e.g., scaled chroma Ct and Cp components) of the pixel that maps in a constant hue plane all out of destination gamut chroma scaled source colors onto a destination gamut boundary surface along a constant intensity line.

In some implementations, applying the inverse chroma mapping operation also includes applying a constant hue variable origin operation to the transformed intensity (I) and the chroma components (Ct and Cp) of the pixel that maps in a constant hue plane all colors in source gamut into a destination gamut along a constant intensity line for each of the colors having an intensity level less than an intersection of a line between a source cusp point and a destination cusp point with an intensity axis, and along lines originated from the intersection for each of the colors having an intensity level greater than the intersection.

Yet another implementation is directed to a computer program product for providing chroma correction of IGM for SDR to HDR image conversion. The computer program product is disposed upon a computer readable medium and comprises computer program instructions that, when executed, cause a computer to convert R,G,B color components in the RGB color format of a pixel to an intensity component (I) and chroma components (Ct and Cp) of an $C_TC_P$ color format, where the R,G,B color components represent red, green, and blue colors. The computer program instructions also cause the computer to apply an intensity transformation operation on the intensity component (I) of the pixel. The computer program instructions also cause the computer to execute a chroma correction operation on the transformed intensity component (I) and the chroma components (Ct and Cp) of the pixel. The computer program instructions also cause the computer to convert the intensity component (I) and the chroma components (Ct and Cp) of the pixel back to the RGB color format.

In some implementations, applying the intensity transformation operation also includes applying the intensity transformation operation further includes applying an inverse tone mapping operation and an opto-optical transfer function to the intensity component (I) of the pixel, and where applying the chroma correction operation to the $IC_TC_P$ color format includes applying a chroma scaling operation, a hue rotation operation, and a chroma mapping operation to the chroma components (Ct and Cp) of the pixel. In some implementations, applying the intensity transformation operation also includes applying an inverse tone mapping operation and an opto-optical transfer function to the intensity component (I) of the pixel, and where applying the chroma correction operation also includes applying a hue rotation operation to the chroma components (Ct and Cp) of the pixel and an inverse chroma mapping operation to the transformed intensity (I) and the rotated Ct and Cp components.

In some implementations, applying the chroma correction operation also includes generating a gamut boundary descriptor using an inverse gamut sampling operation in a constant hue plane by: predicting a gamut boundary point for an elevation angle from radiuses of a plurality of gamut boundary points for a plurality of previously estimated elevation angles; and refining the gamut boundary point along a radius from a middle point between maximum and minimum intensities to the predicted point in the constant hue plane based upon testing the gamut boundary point in R,G,B color coordinates.

In some implementations, applying the chroma correction operation also includes applying a hue rotation operation to the chroma components (Ct and Cp) of the pixel that maps red, green, blue, cyan, magenta, and yellow colors in a source gamut into similar colors in a destination gamut by rotating the chroma components (Ct and Cp) in a constant intensity plane.

In some implementations, applying the chroma mapping operation also includes applying a constant hue constant intensity mapping operation to the chroma components (Ct and Cp) of the pixel that maps in a constant hue plane all out of destination gamut chroma scaled source colors onto a destination gamut boundary surface along a constant intensity line.

In some implementations, applying the inverse chroma mapping operation also includes applying a constant hue variable origin operation to the transformed intensity (I) and the chroma components (Ct and Cp) of the pixel that maps in a constant hue plane all colors in source gamut into a destination gamut along a constant intensity line for each of the colors having an intensity level less than an intersection of a line between a source cusp point and a destination cusp point with an intensity axis, and along lines originated from the intersection for each of the colors having an intensity level greater than the intersection.

Thus, as described herein, mechanisms of the illustrated implementations provide for chroma correction of IGM for SDR image conversion from SCG to WCG for viewing an image on a HDR display while maintaining an artistic intent and an overall visual impression of the original SDR frame and retaining any noise in dark regions and banding in bright regions at non-perceivable (human) level. The chroma correction of SDR/SCG to HDR/WCG image conversion, in order to produce HDR colors that are faithful (e.g., similar and compatible) to their SDR counterparts by chroma components correction in I, $C_T$, $C_P$ color coordinates, is applied after an inverse tone mapping operation and Opto-Optical transfer function and includes chroma scaling followed by hue rotation and chroma mapping operations.

The chroma correction of SDR/SCG to HDR/WCG image conversion, in order to produce colorfulness enhanced HDR colors by intensity and chroma component correction in I, $C_T$, $C_P$ color coordinates, is applied after an inverse tone mapping operation and Opto-Optical transfer function. In addition, the chroma correction includes hue rotation and an inverse chroma mapping operation. The hue rotation operation can map primary and secondary (cusp) colors of a source gamut to corresponding primary and secondary (cusp) colors of a destination gamut by rotation chroma $C_T C_P$ components in constant intensity plane. A constant hue constant intensity (CHCI) operation can be used in the chroma mapping operation by continuously mapping source out-of-gamut colors onto destination gamut surface along constant intensity lines in a constant hue plane.

A constant hue variable origin (CHVO) operation, using two zones in an inverse chroma mapping operation, can continuously map source colors into a destination gamut along constant intensity lines for colors with intensity less than intersection of line between source and destination cusp points and intensity axis (zone 1), and along lines originated from this intersection for other colors (zone 2) in constant hue plane.

Implementations in accordance with the present disclosure will be described in further detail beginning with FIG. 1. As a preliminary matter, FIG. 1 sets forth a diagram of gamut reduction by gamut mapping and gamut expansion by inverse gamut mapping in chroma-intensity plane in accordance with some implementations of the present disclosure. In some implementations, FIG. 1 depicts two graphs 100, 101, each with the intensity (I) component depicted on a y-axis and the chroma (C) component being depicted on the x-axis.

The goal of the Inverse Gamut Mapping procedure is to map each RGB color triple of an image pixel in a source color gamut into corresponding triple of the image pixel in destination color gamut. Also, the various determination and calculations performed in $IC_T C_P$ (Intensity, Tritanopia, Protanopia) or ICH (Intensity, Chroma, Hue) color coordinates are performed as recommended by ITU-R BT.2390, where chroma and hue are calculated as follows in equation 1:

$$C = \sqrt{(C_T)^2 + (C_P)^2} \text{ and } H = \tan^{-1}\left(\frac{C_P}{C_T}\right). \quad (1)$$

In some implementations, the following use case is considered. Image content can be mastered for display with ITU-R BT.709, chromaticity coordinates and luminance in $[L_{min}^{SDR}=0.1, L_{max}^{SDR}=80]$ nits range, and the image's signal is ITU-R BT.709 non-linear gamma encoded, where L is the luminance and nits is the standard unit of luminance used to describe various sources of light. This mastered image content can be displayed on an HDR device with ITU-R BT.2020, DCI-P3 or a monitor with native chromaticity coordinates and luminance in $[L_{min}^{HDR}, L_{max}^{HDR}]$ range, where $L_{min}^{HDR} \leq L_{min}^{SDR}$, $L_{max}^{HDR} \geq L_{max}^{SDR}$, the image's signal is non-linear ITU-R BT.709 gamma or ITU-R BT.2100 PQ encoded, and where PQ is the perceptual quantizer. As ranges of intensity and chroma of the destination color gamut are wider than the ranges of the source gamut, it is a gamut expansion case.

Figure 2:
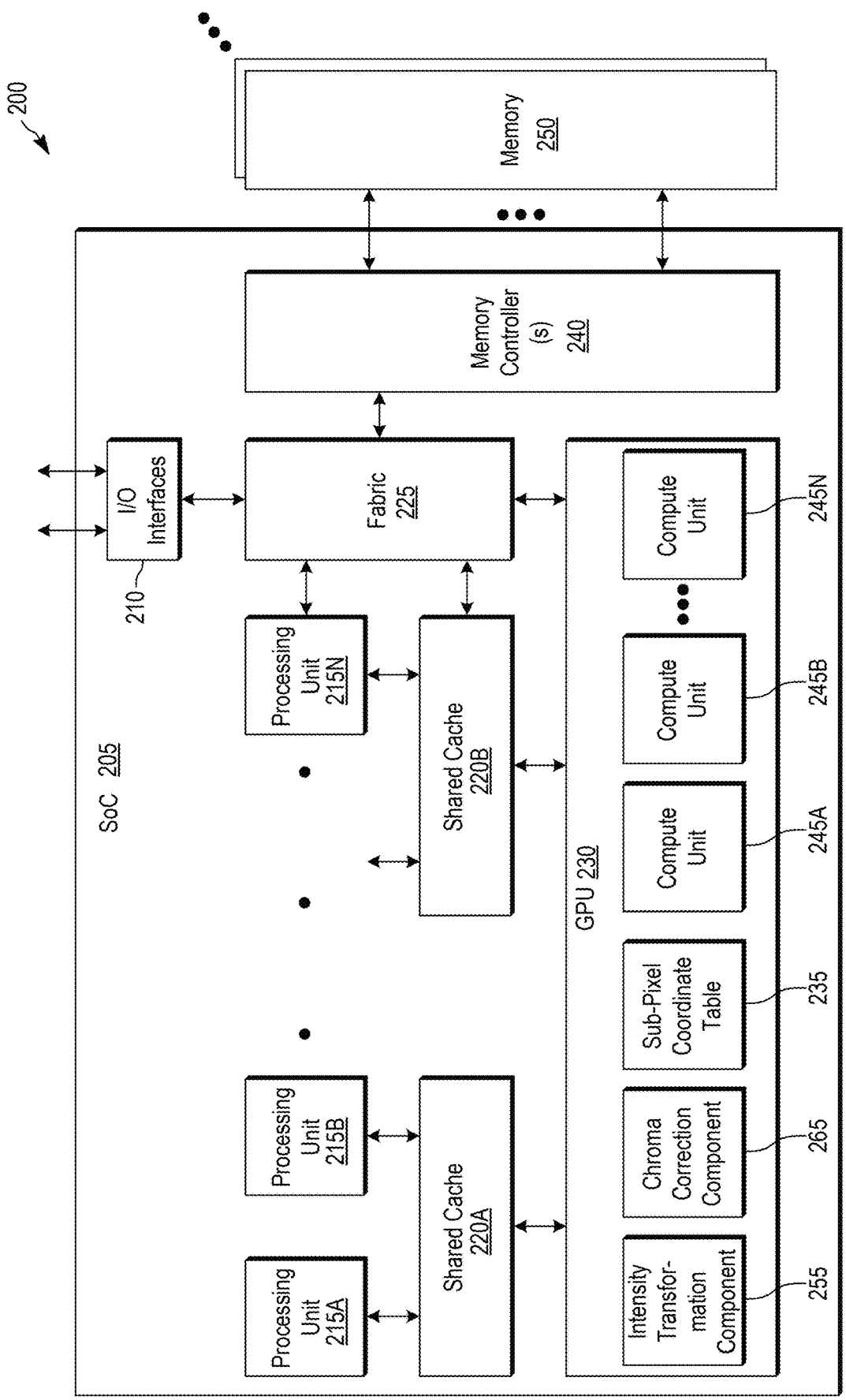
FIG. 2 sets forth a diagram of an example system for providing chroma correction of inverse gamut mapping (IGM) for SDR to HDR image conversion in accordance with some implementations of the present disclosure.

Referring now to FIG. 2, a block diagram of one implementation of a computing system 200 is shown. In some implementations, computing system 200 includes system on chip (SoC) 205 coupled to memory 250. SoC 205 can also be referred to as an integrated circuit (IC). In some implementations, SoC 205 includes processing units 215A-N, Input/Output (I/O) interfaces 210, shared caches 220A-B, fabric 225, graphics processing unit (GPU) 230, and memory controller(s) 240. SoC 205 can also include other components not shown in FIG. 2 to avoid obscuring the figure. Processing units 215A-N are representative of any number and type of processing units. In some implementations, processing units 215A-N are central processing unit (CPU) cores. In another implementation, one or more of processing units 215A-N are other types of processing units (e.g., specific integrated circuit (ASIC), field programmable gate array (FPGA), digital signal processor (DSP)). Processing units 215A-N are coupled to shared caches 220A-B and fabric 225.

In some implementations, processing units 215A-N are configured to execute instructions of a particular instruction set architecture (ISA). Each processing unit 215A-N includes one or more execution units, cache memories, schedulers, branch prediction circuits, and so forth. In some implementations, the processing units 215A-N are configured to execute the main control software of system 200, such as an operating system. Generally, software executed by processing units 215A-N during use can control the other components of system 200 to realize the desired functionality of system 200. Processing units 215A-N can also execute other software, such as application programs.

GPU 230 includes an intensity transformation component 255, a chroma correction component 265, a sub-pixel coordinate table 235, and compute units 245A-N which are representative of any number and type of compute units that are used for graphics or general-purpose processing.

The GPU 230, using the intensity transformation component 255 and the chroma correction component 265, provides chroma correction of IGM for SDR to HDR image conversion. The GPU 230, using the intensity transformation component 255 and the chroma correction component 265, converts R,G,B color components in the RGB color format of a pixel to an intensity component (I) and chroma components (Ct and Cp) of an ICtCp color format, where the R,G,B color components represent red, green, and blue colors.

The intensity transformation component 255 applies an intensity transformation operation on the intensity component (I) of the pixel, where the intensity component (I) is transformed. The chroma correction component 265 executes a chroma correction operation on the intensity component (I) and the chroma components (Ct and Cp) of the pixel. GPU 230, using the intensity transformation component 255 and the chroma correction component 265, converts the intensity component (I) and the chroma components (Ct and Cp) of the pixel back to the RGB color format.

In some implementations, intensity transformation component 255 applies an inverse tone mapping operation and an opto-optical transfer function to the intensity component (I) of the pixel, and the chroma correction component 265 applies a chroma scaling operation, a hue rotation operation, and a chroma mapping operation to the chroma components (Ct and Cp) of the pixel. In some implementations, applying the intensity transformation operation also includes applying an inverse tone mapping operation and an opto-optical transfer function to the intensity component (I) of the pixel. Applying the chroma correction operation also includes applying a hue rotation operation to the chroma components (Ct and Cp) of the pixel and an inverse chroma mapping operation to the transformed intensity (I) and the corrected Ct and Cp components.

In some implementations, the chroma correction component 265 generates a gamut boundary descriptor using an inverse gamut sampling operation in a constant hue plane by: predicting a gamut boundary point for an elevation angle from radiuses of a plurality of gamut boundary points for a plurality of previously estimated elevation angles; and refining the gamut boundary point along a radius from a middle point between maximum and minimum intensities to the predicted point in the constant hue plane based upon testing the gamut boundary point in R,G,B color coordinates.

In some implementations, the chroma correction component 265 applies a hue rotation operation to the chroma components (Ct and Cp) of the pixel that maps red, green, blue, cyan, magenta, and yellow colors in a source gamut into similar colors in a destination gamut by rotating the chroma components (Ct and Cp) in a constant intensity plane.

In some implementations, the chroma correction component 265 applies a constant hue constant intensity mapping operation to chroma components (Ct and Cp) (which are scaled chroma Ct and Cp components) of the pixel that maps in a constant hue plane all out of destination gamut chroma scaled source colors onto a destination gamut boundary surface along a constant intensity line.

In some implementations, the chroma correction component 265 applies a constant hue variable origin operation to the transformed intensity (I) and the chroma components (Ct and Cp) of the pixel that maps in a constant hue plane all colors in source gamut into a destination gamut along a constant intensity line for each of the colors having an intensity level less than an intersection of a line between a source cusp point and a destination cusp point with an intensity axis, and along lines originated from the intersection for each of the colors having an intensity level greater than the intersection.

Compute units 245A-N can be implemented as shader arrays, shader engines, shader units, single instruction multiple data (SIMD) units, or SIMD cores. Each compute unit 245A-N can include a plurality of execution units.

GPU 230 is coupled to shared caches 220A-B and fabric 225. In some implementations, GPU 230 is configured to execute graphics pipeline operations such as draw commands, pixel operations, geometric computations, and other operations for rendering an image to a display. In another implementation, GPU 230 is configured to execute operations unrelated to graphics. In a further implementation, GPU 230 is configured to execute both graphics operations and non-graphics related operations.

I/O interfaces 210 are coupled to fabric 225, and I/O interfaces 210 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 210. Such peripheral devices include (but are not limited to) displays, keyboards, mice, printers, scanners, joysticks or other types of game controllers, media recording devices, external storage devices, network interface cards, and so forth.

SoC 205 is coupled to memory 250, which includes one or more memory modules. Each of the memory modules includes one or more memory devices mounted thereon. In some implementations, memory 250 includes one or more memory devices mounted on a motherboard or other carrier upon which SoC 205 is also mounted. In some implementations, memory 250 is used to implement a random-access memory (RAM) for use with SoC 205 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 250 includes (but is not limited to) double data rate (DDR) DRAM, DDR2 DRAM, DDR3 DRAM, and so forth. Although not explicitly shown in FIG. 2, SoC 205 can also include one or more cache memories that are internal to the processing units 215A-N and/or compute units 245A-N. In some implementations, SoC 205 includes shared caches 220A-B that are utilized by processing units 215A-N and compute units 245A-N. In some implementations, caches 220A-B are part of a cache subsystem including a cache controller.

It is noted that the letter "N" when displayed herein next to various structures is meant to generically indicate any number of elements for that structure (e.g., any number of processing units 215A-N) including one. Additionally, different references within FIG. 2 that use the letter "N" (e.g., processing units 215A-N and compute units 245A-N) are not intended to indicate that equal numbers of the different elements are provided (e.g., the number of processing units 215A-N can differ from the number of compute units 245A-N).

In various implementations, computing system 200 can be a computer, laptop, mobile device, server or any of various other types of computing systems or devices. It is noted that the number of components of computing system 200 and/or SoC 205 can vary from implementation to implementation. There can be more or fewer of each component/subcomponent than the number shown in FIG. 2. For example, in another implementation, SoC 205 can include multiple memory controllers coupled to multiple memories. It is also noted that computing system 200 and/or SoC 205 can include other components not shown in FIG. 2. Additionally, in other implementations, computing system 200 and SoC 205 can be structured in other ways than shown in FIG. 2.

For further explanation, FIG. 3 sets forth a diagram of IGM for SDR to HDR image conversion in accordance with some implementations of the present disclosure. Inverse Gamut Mapping for each pixel with values (R', G', B') (or red "R," green "G", or blue "B") of input image can be performed as follows: R', G', B' values can be provided 310 as input for converting the R', G', B' values to I, $C_T$, $C_P$ values. An intensity transformation operation 320 can be executed to transform the intensity value I (e.g., intensity component of the I, $C_T$, $C_P$ values). Next, a chroma correction operation 330 can be performed to correct chroma $C_T$, $C_P$ values. Finally, a conversion operation 340 can be performed to convert the updated I, $C_T$, $C_P$ values to new R', G', B' values.

Figure 5:
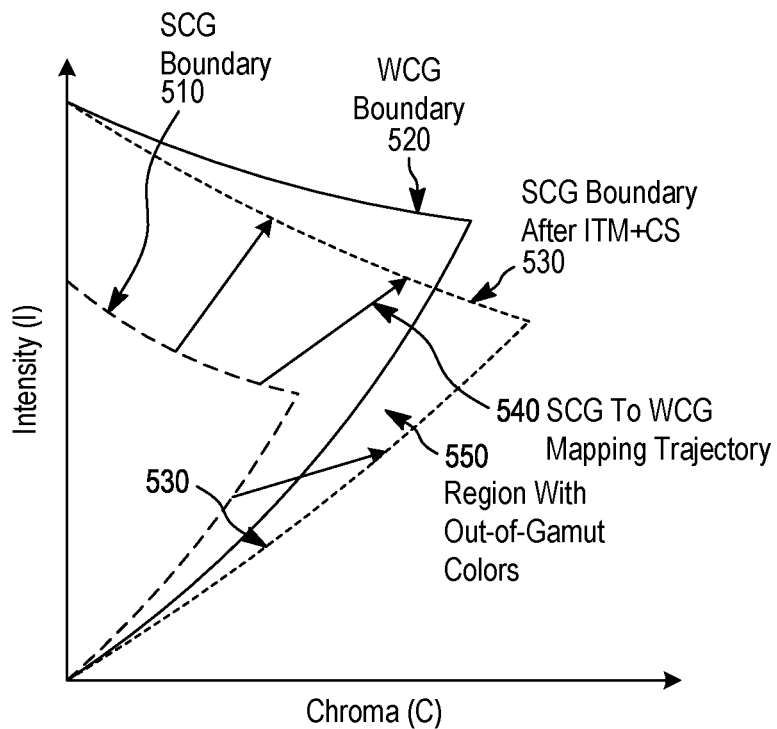
FIG. 5 sets forth a diagram of chroma scaling of conventional IGM in Chroma-Intensity plane in accordance with some implementations of the present disclosure.

In contrast, FIG. 4 sets forth a diagram of a conventional IGM procedure for converting SCG to WCG. For example, following the conversion 410 of R', G', B' values to I, $C_T$, $C_P$ values, an Inverse Tone Mapping (ITM) operation 420 is executed that generates a WCG equivalent of SCG luminance channel I of the pixel. Next, Chroma Scaling (CS) operation 430 adjusts chroma channels $C_T$, $C_P$ of the pixel with changed luminance as follows using equation 2:

$$I^{WCG} = ITM(I^{SCG}), C_T^{WCG} = C_T^{SCG} \cdot \frac{I^{WCG}}{I^{SCG}}, C_P^{CS} = C_P^{SCG} \cdot \frac{I^{WCG}}{I^{SCG}},, \quad (2)$$

where ($I^{SCG}$, $C_T^{SCG}$, $C_P^{SCG}$) are the pixel's values in the source (narrow) gamut and ($I^{WCG}$, $C_T^{WCG}$, $C_P^{WCG}$) are the pixel's values in the destination (wide) gamut. ITM (I) is one of the known Inverse Tone Mapping functions. After chroma scaling, the method of FIG. 4 continues by converting 440 the updated I, $C_T$, $C_P$ values to R', G', B' values. This conventional IGM procedure of FIG. 4, using ITM and CS operations, produces some colors outside of the target gamut (out-of-gamut colors) as shown in FIG. 5. FIG. 5 sets forth a diagram of chroma scaling of conventional IGM in a Chroma-Intensity plane. As a result, these colors undergo clipping that can introduce false colors.

That is, the intensity component (I) of the Chroma-Intensity plane is on the y-axis and the chroma C is on the x-axis. Results of applying only the ITM and the CS operation, as depicted in FIG. 5, the SCG color boundary is mapped (e.g., depicted as the SCG boundary 510) to WCG boundary 520. However, the SGG to WCG mapping trajectory 540 produces some colors outside of the target gamut (out-of-gamut colors 550) having a SCG boundary with out-of-gamut colors after the ITM and the CS operations are performed (e.g., SCG boundary 530 after ITM and CS in FIG. 5).

Figure 6:
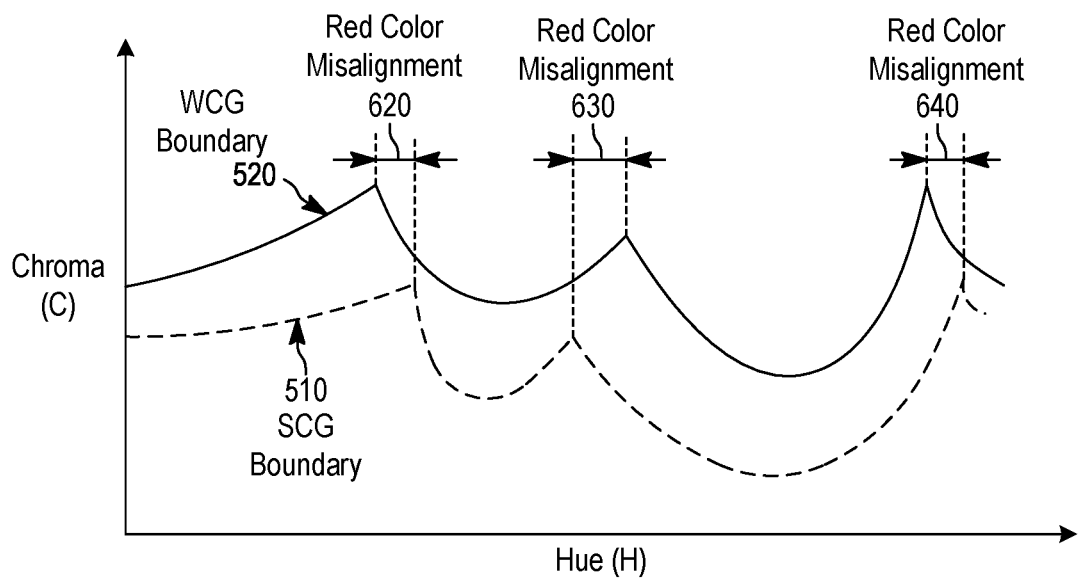
FIG. 6 sets forth a diagram of primary colors misalignment of conventional IGM in Hue-Chroma plane in accordance with some implementations of the present disclosure.

For further explanation, FIG. 6 sets forth a diagram of primary colors misalignment of conventional IGM in Hue-Chroma plane. The hue is depicted on the x-axis and the chroma C is depicted on the y-axis of Hue-Chroma plane. The primary colors of a source gamut SCG (having and SCG boundary 510) cannot be angular aligned with primary colors of a destination gamut WCG (having WCG boundary 520), as depicted showing red color misalignment 620, 630, and 640 in FIG. 6. This misalignment produces "chroma inversion" artifacts when the most saturated (cusp) colors in source gamut do not map on the most saturated (cusp) colors in destination gamut as in FIG. 6.

However, mechanisms of the illustrated implementations, as described herein, provide for a chroma correction operation for improving the IGM operation to expand SCG of SDR image to be displayed on an HDR display with WCG. The chroma correction operation can also execute in two modes of operation: a basic chroma correction operation (e.g., basic color Correction (BCC)) and an advanced chroma correction operation (e.g., advanced color correction (ACC)). A choice of chroma correction operations modes (e.g., basic or advanced) for SDR/SCG to HDR/WCG conversion is defined by requirements and user's preferences.

Figure 7:
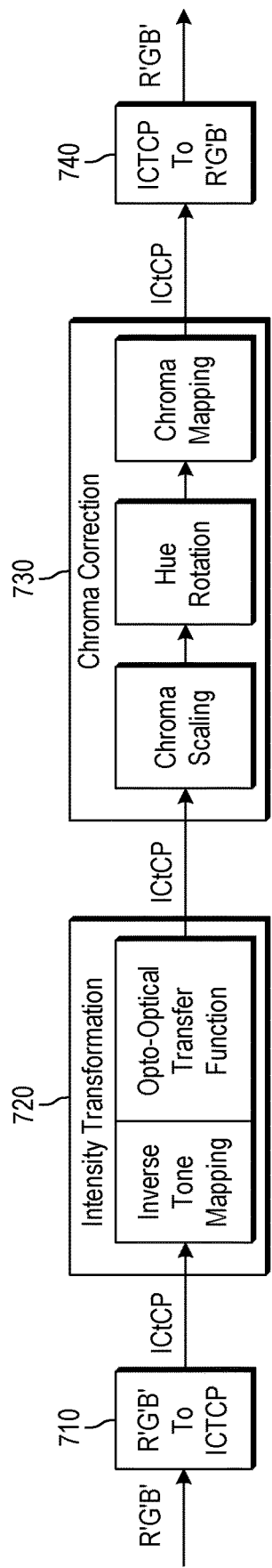
FIG. 7 sets forth a diagram of a basic chroma correction for providing chroma correction of IGM for SDR image with SCG to HDR image with WCG conversion for each pixel in an image in RGB color format in accordance with some implementations of the present disclosure.

For further explanation, FIG. 7 sets forth a diagram of a basic chroma correction (BCC) for providing chroma correction of IGM for SDR image with SCG to HDR image with WCG conversion for each pixel in an image in RGB color format in accordance with some implementations of the present disclosure. As depicted, following a conversion operation 710 of converting R', G', B' values, received as input, to I, $C_T$, $C_P$ values, an improved IGM procedure is used that includes an intensity transformation operation 720. The intensity transformation operation 720 applies an Inverse Tone Mapping (ITM) operation with an incorporated Opto-Optical Transfer Function (OOTF) operation to enable a perception-based luminance transformation.

A chroma correction operation 730 is applied to generate accurate color adjustment. In some implementations, the chroma correction operation 730 includes chroma scaling, hue rotation, and chroma mapping. A conversion operation 740 can be performed to convert the updated I, $C_T$, $C_P$ values to new R', G', B' values. In this way, the improved IGM procedure is used to expand color gamut by maintaining artistic intent and the overall visual impression of the original SDR frame with keeping visual artifacts like noise in dark regions and banding in bright regions at non-perceivable level. The basic chroma correction operation of the inverse gamut mapping includes the chroma scaling followed by hue rotation and the chroma mapping operation. In this basic mode, the color corrections produce HDR colors that are faithful (e.g., similar, compatible, or equal) to their SDR counterparts by chroma component correction in $IC_TC_P$ color coordinates.

Figure 8:
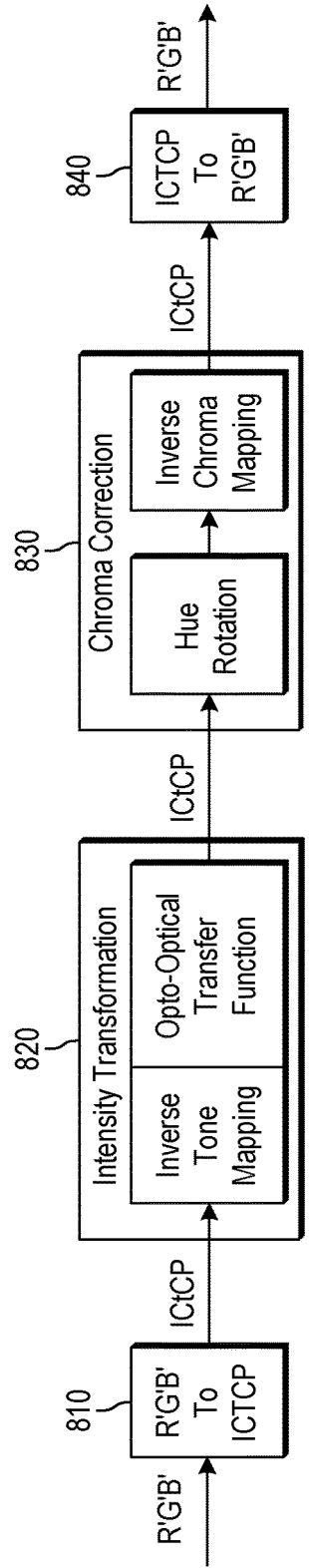
FIG. 8 sets forth a diagram of an advance chroma correction for providing chroma correction of IGM for SDR image with SCG to HDR image with WCG conversion for each pixel in an image in RGB color format in accordance with some implementations of the present disclosure.

For further explanation, FIG. 8 sets forth a diagram of an advanced chroma correction (ACC) for providing chroma correction of IGM for SDR to HDR image conversion in accordance with some implementations of the present disclosure. As depicted, following a conversion operation 810 of converting R', G', B' values, received as input, for converting R', G', B' values to I, $C_T$, $C_P$ values, an improved IGM procedure is used that includes an intensity transformation operation 820 for SDR/SCG to HDR/WCG image conversion. The intensity transformation operation 820 applies both an Inverse Tone Mapping (ITM) operation with an incorporated Opto-Optical Transfer Function (OOTF) operation to enable a perception-based luminance transformation.

A chroma correction operation 830 is applied to generate accurate color adjustment. In some implementations, the chroma correction operation 830 includes hue rotation and inverse chroma mapping. A conversion operation 840 can be performed to convert the updated I, $C_T$, $C_P$ values to new R', G', B' values. The advanced chroma correction operation of the inverse gamut mapping includes the hue rotation operation followed by inverse chroma mapping operation. In this advance mode, color correction produces HDR colors enhanced by intensity and chroma components correction in I, $C_T$, $C_P$ color coordinates.

It should be noted that the basic chroma correction operation, of FIG. 7, is not a one-to-one mapping operation, e.g., some pixels have chroma clipped values, and there are points in the destination gamut that do not have corresponding points in the source gamut. The advanced chroma correction operation of FIG. 8 maps an edge of a source color gamut onto an edge of a destination color gamut, which is a one-to-one mapping operation. The basic chroma correction operation and advanced chroma correction operation of the chroma correction operation for improved inverse gamut mapping are described in more detail, below.

Inverse Gamut Sampling

To map colors from one gamut to another, a gamut boundary descriptor (GBD) for color gamut can be determined. The current state of the art for gamut boundaries determination is as follows. First, a set of R', G', B' samples are generated and then converted to I, $C_T$, $C_P$ values. Delaunay triangulation and Convex Hull are used to extract a set of triangles to represent surface of the color volume. To speed up mapping, vertices of the surface triangles can be resampled to generate regular two-dimensional (2D) patches.

Figure 9:
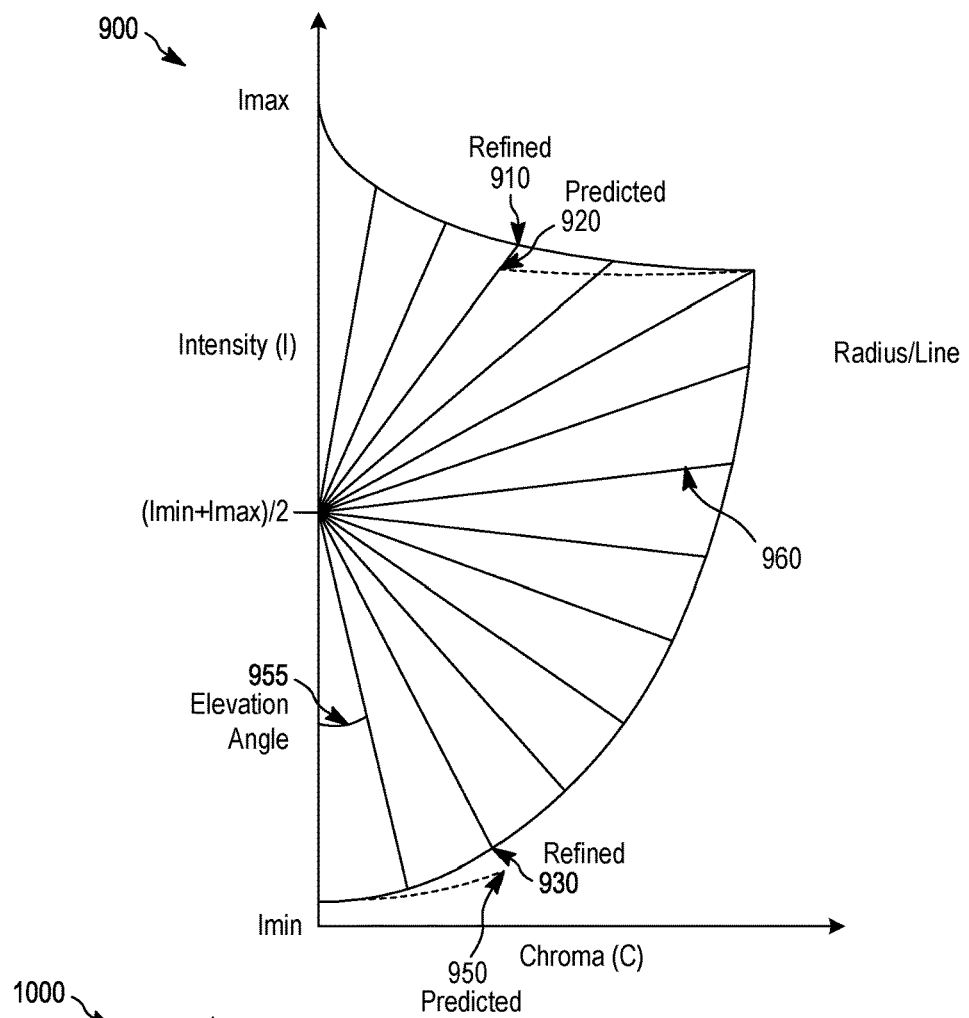
FIG. 9 sets forth a diagram for gamut boundary point detection by refinement of the predicted gamut boundary point in a Chroma-Intensity plane in accordance with some implementations of the present disclosure.

For further explanation, FIG. 9 sets forth a diagram for gamut boundary point detection by refinement of the predicted gamut boundary point in a Chroma-Intensity plane 900 in accordance with some implementations of the present disclosure. In some implementations, applying the chroma correction operation (as described in FIG. 3) can include generating a gamut boundary descriptor using an inverse gamut Sampling (IGS) operation in a constant hue plane by: predicting a gamut boundary point for an elevation angle from radiuses of a plurality of gamut boundary points for a plurality of previously estimated elevation angles; and refining the gamut boundary point along a radius from a middle point between maximum and minimum intensities to the predicted point in the constant hue plane based upon testing the gamut boundary point in R,G,B color coordinates.

In some implementations, the inverse gamut Sampling (IGS) operation of the gamut boundary description determination for the chroma Correction operation can be provided and used as an enhancement to gamut boundaries determination in terms of accuracy and computational complexity. In some implementations, a set of $N_h^{GBD}$ tables $\{T_{GBD}^h\}$ is generated. Each table can include intensity and chroma values of gamut boundary points for a constant hue. The points can be calculated for regularly spread $N_a^{GBD}$ elevation angles in the Chroma-Intensity plane 900. A size of gamut boundary descriptor can be determined such as, for example, $N_h^{GBD} \times N_a^{GBD} \times 2$ values.

In some implementations, inverse gamut sampling for a constant hue and an elevation angle such as, elevation angle 955 can be provided. In some implementations, samples, along a line 960 (radius) from (0, $I_{min}+I_{max}$)/2) point can be tested for validity by converting $IC_TC_P$ color format to R'G'B' color format and determining if the components have value in [$I_{min}$, $I_{max}$] range. If R'G'B' triple is valid for a tested sample, each subsequent sampled on the line 960 can be tested until new R'G'B' color is determined to be invalid. In some implementations, a previous valid sample is a boundary point and its intensity and chroma values are saved in a gamut boundary descriptor for the hue and the elevation angle 955. The inverse gamut sampling process can significantly speed up if a boundary point for a current elevation angle is predicted from the radiuses of the boundary points of two previously estimated elevation angles, as depicted in FIG. 9. The predicted radius such as, for example predicted radius 920 or predicted radius 950 is further refined such as, for example, refined radius 910 or refined radius 930 by gamut sampling procedure.

It should be noted, by way of example only, a default number of constant hues can be 360 and a default number of elevation angles is 181. A size of gamut boundary descriptor can then be 360×181×2 values. A number of constant hues and boundary points per hue can be reduced to fulfil software implementation memory and execution time requirements. Also, less boundary points means potentially less accurate boundary description and less accurate gamut mapping. In some implementations, the basic chroma correction operation of the improved IGM operation requires a GBD for only a destination gamut. The advanced chroma correction operation of the improved IGM operation requires GBD for source and destination gamut.

Inverse Tone Mapping

Figure 10:
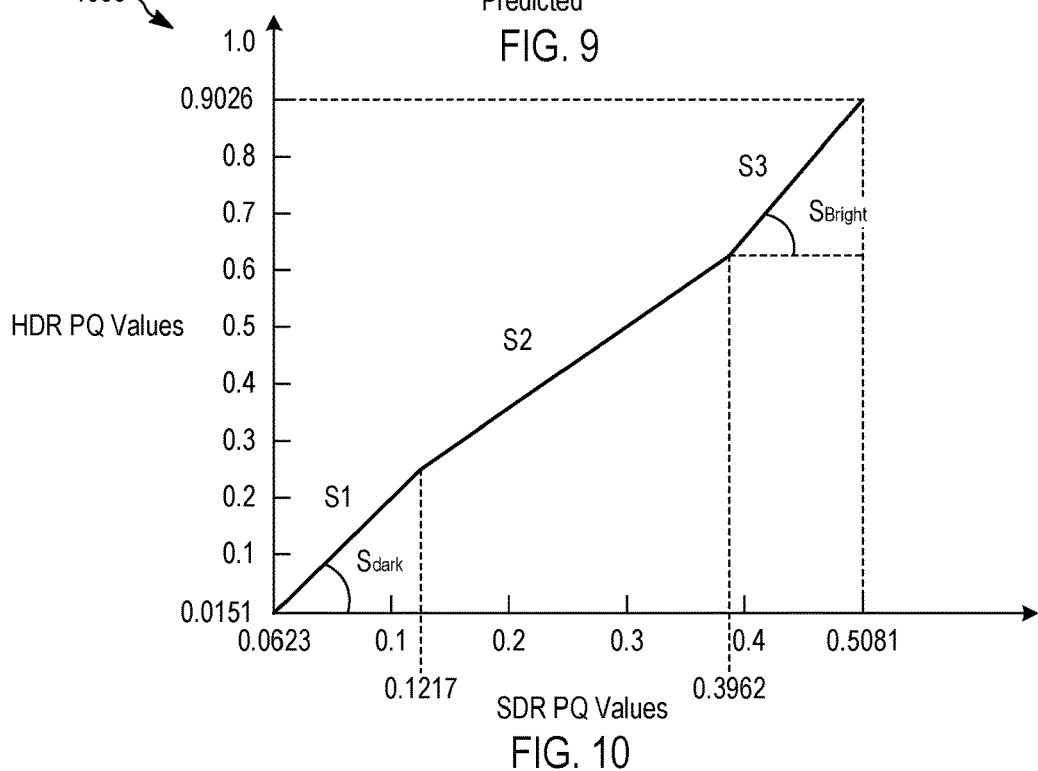
FIG. 10 sets forth a graph diagram of Inverse Tone Mapping curve for HDR display in accordance with some implementations of the present disclosure.

In some implementations, the inverse tone mapping operation takes a luminance channel as input of an SDR frame and generates an HDR equivalent such as, for example, by adjusting a contrast of a converted signal for dark, normal and bright areas of an image. For example, a piece-wise linear curve with two breaking points $L_{dark}^{SDR}$ and $L_{bright}^{SDR}$ for SDR luminance signal can make such adjustment, as depicted in FIG. 10 showing Inverse Tone Mapping curve for [0.005, 4000] nits HDR display. That is, FIG. 10 sets forth a graph 1000 of an inverse tone mapping curve for HDR display. The graph 1000 depicts the HDR PQ values on the y-axis and the SDR PQ values on the x-axis with arbitrary values used for illustrative convenience. The OOTF system gamma curve (e.g., gamma) is depicted as a function of peak luminance. The inverse tone mapping curve maps the SDR PQ values from [0.0623-0.5081] (corresponding to [0.1-100] nits) to [0.0151-0.9026] (corresponding to [0.005-4000] nits) in the HDR domain. Three linear segments such as, for example S1, S2, and S3 in the figure are the segments assigned to map dark, normal, and bright regions to HDR domain, respectively. Using the inverse tone mapping operation, the SDR frame's luminance dynamic range is divided into the three regions, and the mapping curve is a piece-wise linear curve with two breaking points, such as, for example, $L_{dark}^{SDR}=0.1217$ and $L_{bright}^{SDR}=0.3962$. In some implementations, the piece-wise linear mapping curve has two slopes $S_{dark}$ and $S_{bright}$ that are assigned to dark and bright regions. The slopes are assigned in a manner that produce high visual quality HDR frames while at the same time keeping the visual artifacts at non-perceivable levels.

More specifically, the breaking points $L_{dark}^{SDR}$ and $L_{bright}^{SDR}$ that define the regions can be parametrized as: a dark region with luminance in a range [$L_{min}^{SDR}, L_{dark}^{SDR}$] nits, a normal region with luminance in a range ($L_{dark}^{SDR}, L_{bright}^{SDR}$] nits, and a bright region with luminance in a range [$L_{bright}^{SDR}, L_{max}^{SDR}$] nits.

Slopes of the piece-wise linear curve for the regions can be assigned so as to produce higher visual quality HDR frames while maintaining the visual artifacts at non-perceivable levels. For example, the range of slope limits for dark and bright regions can be $\vartheta_{dark}^{min} \leq \vartheta_{dark} \leq \vartheta_{dark}^{max}$, and $\vartheta_{bright}^{min} \leq \vartheta_{bright} \leq \vartheta_{bright}^{max}$, where $\vartheta$ is an angle. The normal region slope is uniquely defined by the other two slopes.

In some implementations, normalized intensity tuning parameters (P) calculated from the slopes can be defined as follows:

$$P_{dark}^{ITM} = \frac{S_{dark}}{R_{SDR}^{HDR}}, P_{bright}^{ITM} = \frac{(I_{max}^{SDR} - I_{min}^{SDR}) - S_{bright} \cdot R_{SDR}^{HDR} \cdot (I_{max}^{SDR} - I_{bright}^{SDR})}{I_{bright}^{SDR} - I_{min}^{SDR}}, \quad (3)$$

$$\text{where } R_{SDR}^{HDR} = \frac{I_{max}^{HDR} - I_{min}^{HDR}}{I_{max}^{SDR} - I_{min}^{SDR}},$$

The output intensity $I^{ITM}$ for input SDR intensity $I^{SDR}$ can be calculated as follows:

$$I^{ITM} = R_{SDR}^{HDR} \cdot (I^{SDR} - I_{min}^{SDR}) + I_{min}^{HDR} + D_{int}^{norm}, \quad (4),$$

where normalized intensity delta $D_{int}^{norm}$ for a pixel with intensity $I^{SDR}$ is calculated by one the following equations:

$$D_{int}^{norm} = \begin{cases} 0.0 & I^{SDR} \leq I_{min}^{SDR}, \\ 0.0 + (D_{dark}^{norm} - 0.0) \cdot \frac{I^{SDR} - I_{min}^{SDR}}{I_{dark}^{SDR} - I_{min}^{SDR}}, & I_{min}^{SDR} < I^{SDR} \leq I_{dark}^{SDR}, \\ D_{dark}^{borm} + (D_{bright}^{norm} - D_{dark}^{norm}) \cdot \frac{I^{SDR} - I_{dark}^{SDR}}{I_{bright}^{SDR} - I_{dark}^{SDR}} & I_{dark}^{SDR} < I^{SDR} \leq I_{bright}^{SDR}, \\ D_{bright}^{norm} + (0.0 - D_{bright}^{norm}) \cdot \frac{I^{SDR} - I_{bright}^{SDR}}{I_{max}^{SDR} - I_{bright}^{SDR}} & I_{bright}^{SDR} < I^{SDR} \leq I_{max}^{SDR}, \\ 0.0 & \text{otherwise} \end{cases} \quad (5)$$

$$D_{dark}^{norm} = I_{dark}^{SDR} \cdot (P_{dark}^{ITM} - 1.0), D_{bright}^{norm} = I_{bright}^{SDR} \cdot (P_{bright}^{ITM} - 1.0)..\quad(6)$$

Opto-Optical Transfer Function

In accordance with ITU-R BT.2390 recommendations, the overall system non-linearity, or "rendering intent" can be defined by an Opto-Optical Transfer Function (OOTF) operation that maps relative scene light to display linear light. In some implementations, the OOTF is a transfer function having scene light as input and the displayed light as output. Also, OOTF can be referred to as "rendering intent" or "system gamma."

The OOTF can be the result of the opto-electronic transfer function (OETF) and the electro-optical transfer function (EOTF) and is typically non-linear. The OOTF plays the role of applying a rendering intent. For example, in some broadcasting systems (e.g., a television system), the displayed light is not linearly related to the light captured by the image capturing device. As such, the OOTF can be applied. Thus, the rendering intent is needed to compensate for the psychovisual effects of watching an emissive screen in a dark or dim environment, which affects the adaptation state (sensitivity) of the eye. Conventional SDR television has an OOTF, which is a gamma curve with a system gamma of 1.2. However, for HDR, the brightness of displays and backgrounds/surround will vary widely, and the system gamma will need to vary accordingly.

The variation of a system gamma γ with display's nominal peak luminance $L_w$ in a range such as, for example, [80, 4000] nits and surround luminance $L_{ambient}$ can be estimated as follows based on the ITU-R BT.2390:

$$Y = Y^{\gamma}, \quad (7)$$

$$\gamma = \gamma_{ref} \cdot k^{\log_2\left(\frac{L_w}{L_{ref}}\right)} \cdot \mu^{\log_2\left(\frac{L_{ambient}}{L_{ambientref}}\right)}, \quad (8)$$

where $\gamma_{ref}=1.2$, $k=1.111$, $L_{ref}=1000$ nits, $\mu=0.98$, $L_{ambientref}=5$ nits. Under surround brightness $L_{ambient}=5$ nits, for SDR gamut with $L_w^{SDR}=100$ nits the system gamma $\gamma_{SDR}=0.78$, and for HDR gamut with $L_w^{HDR}=1000$ nits the system gamma $\gamma_{HDR}=1.2$.

In some implementations, the operations, as described herein, of the IGM operation of SDR to HDR conversion, the OOTF system gamma $\gamma^{OOTF}$ can be determined as follows, where $P_{gain}^{OOTF}$ is a tuning parameter:

$$\gamma^{OOTF} = P_{gain}^{OOOTF} \cdot k^{\log_2\left(\frac{L_w^{HDR}}{L_{ref}}\right)} \cdot \mu^{\log_2\left(\frac{L_{ambient}}{L_{ambientref}}\right)}, \quad (9)$$

Figure 11:
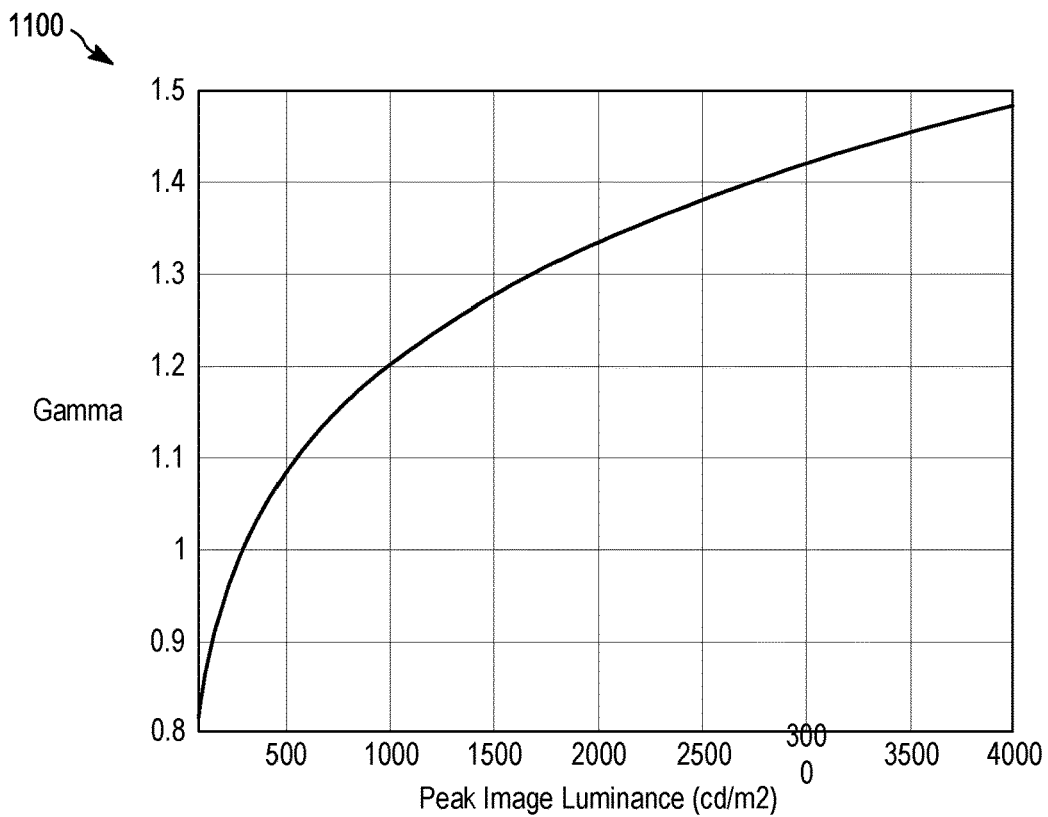
FIG. 11 sets forth a graph diagram of an opto-optical transfer function (OOTF) system gamma as a function of peak luminance in accordance with some implementations of the present disclosure.
Figure 12:
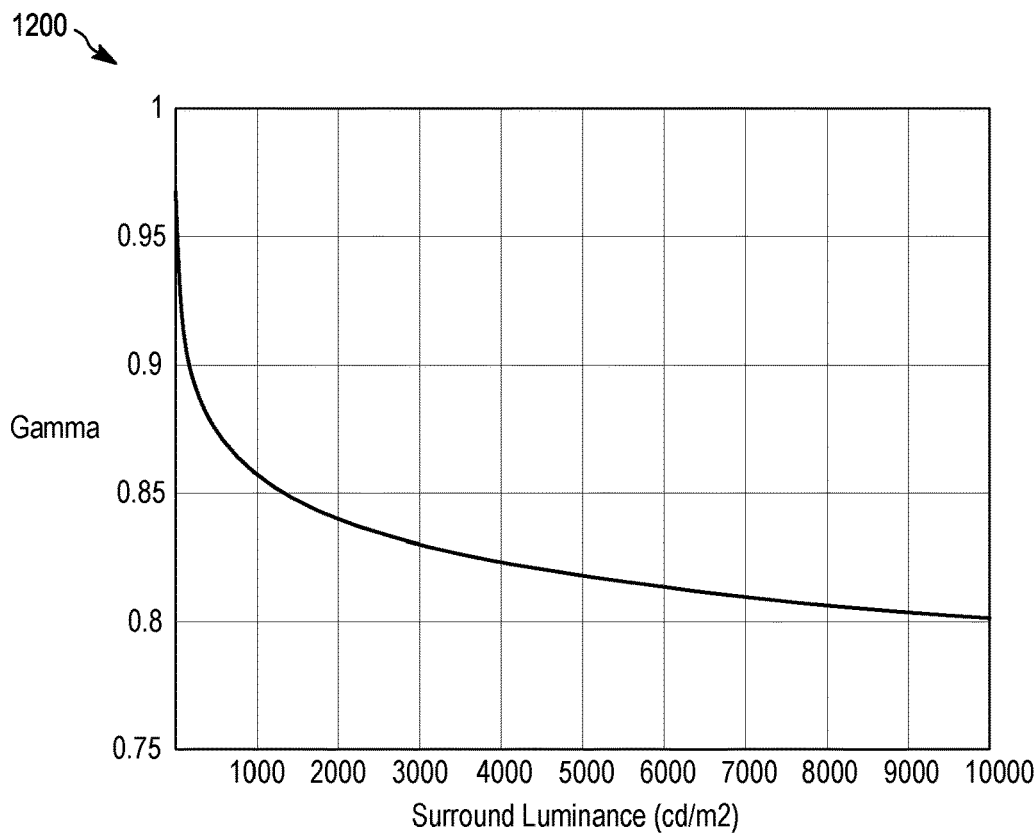
FIG. 12 sets forth a graph diagram of an opto-optical transfer function (OOTF) system gamma as a function of surround luminance in accordance with some implementations of the present disclosure.

Examples of the OOTF system gamma curve 1100 as a function of peak luminance is depicted in FIG. 11. The gamma ranges from 0.8 to 1.6 and the measured peak image luminance ranges from 0 to 4000 candela per square meter (cd/sq). While FIG. 12 sets forth an example of an OOTF system gamma 1200 as a function of surround luminance. The gamma ranges from 0.75 to 1 and the measured surround luminance ranges from 500 to 4000 candela per square meter (cd/sq).

Chroma Scaling

Chroma scaling operation can adjust chroma of tone mapped intensity of each pixel ($I^{ITM}$, $C_T^{SDR}$, $C_P^{SDR}$) as follows:

$$C_T^{CS} = C_T^{SDR} \cdot G^{CS} \cdot \frac{I^{ITM}}{I^{SDR}}, C_P^{CS} = C_P^{SDR} \cdot G^{CS} \cdot \frac{I^{ITM}}{I^{SDR}},, \quad (10)$$

where $I^{SDR}$ is original intensity of a pixel and $I^{ITM}$ is intensity of the pixel after ITM operator. Tuning parameter $G^{CS}$ is a gain of chroma enhancement in a range [0.75, 1.25] with default value 1.0.

Hue Rotation

The objective of Hue Rotation operator is to avoid "chroma inversion" issue by mapping primary (red, green, blue) and secondary (cyan, magenta, yellow) colors of source gamut to corresponding primary and secondary colors of destination gamut. For example, red color (1,0,0) in source gamut maps to red color (1,0,0) in destination one, and so on.

As a matter of fact, rotation angle in $IC_TC_P$ coordinates (or hue shift in ICH coordinates) depends on intensity of a color. To optimize execution time, hues of anchor (grid) colors are pre-calculated for intensities in a range $[I_{min}^d, I_{max}^d]$ for source (content) and destination (display) color spaces. Table for source gamut is calculated after Tone Mapping, so the intensity range is the same as for destination gamut.

Two Primary Hue Tables (PHTs) are generated: $H_s^e(I_i, H_j)$ and $H_d^e(I_i, H_j)$, where $i=[0, N_I^{HR}-1]$, $j=[0, N_H^{HR}-1]$. Default number of intensities $N_I^{HR}$ is 33, and number of hues $N_H^{HR}$ is always 6 (magenta, red, yellow, green, cyan and blue).

The tables are generated by calculation $N_I^{HR} \cdot N_H^{HR}$ pairs $(I_{(i,j)}H_{(i,j)})$ for source and destination color spaces as follows:

$$R_i' = \frac{i \cdot R_j}{N_I - 1}, G_i' = \frac{i \cdot G_j}{N_I - 1}, B_i' = \frac{i \cdot B_j}{N_I - 1}, R_j = \{1, 1, 1, 0, 0, 0\}, \quad (11)$$

$$G_j = \{0, 0, 1, 1, 1, 0\}, B_j = \{1, 0, 0, 0, 1, 1\}.$$

The pairs are ordered by hue and intensity values with uniform resampling along intensity axis. During Hue Rotation, estimated $H_s^e(I, H)$ and $H_d^e(I, H)$ for particular $IC_TC_P$ are bi-linear interpolated from the pre-calculated tables. The corrected hue is estimated as follows:

$$H_s'(I,C_T,C_P)=H_s(I,C_T,C_P)+(H_d^e(I,H)-H_s^e(I,H)). \quad (12).$$

Figure 13:
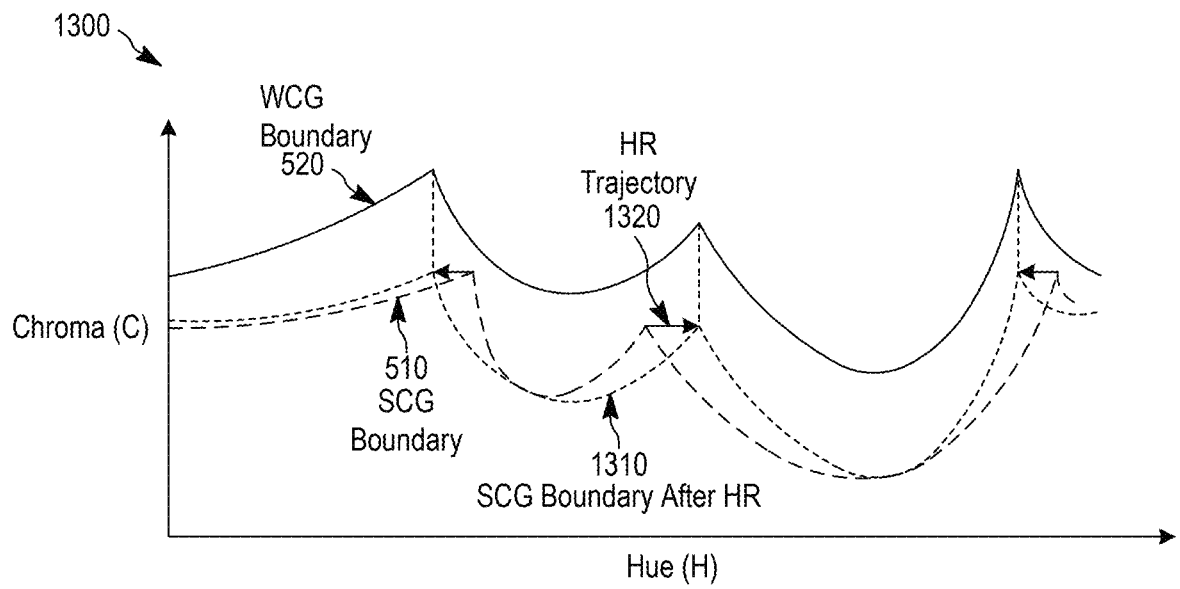
FIG. 13 sets forth a diagram of primary colors alignment after Hue Rotation in accordance with some implementations of the present disclosure.

For further explanation, FIG. 13 sets forth a diagram of primary colors alignment after hue rotation in a constant intensity plane 1300. The constant intensity plane 1300 depicts an SCG boundary 510 and a WCG boundary 520. As depicted, after a hue rotation operation, all peaks of the source gamut (shown with the SCG boundary 510) are shifted to match the corresponding peaks of the destination gamut (shown as SCG boundary 1310 after hue rotation). That is, when applying the chroma correction operation, the chroma correction operation applies a hue rotation operation to the chroma components (Ct and Cp) of the pixel that maps red, green, blue, cyan, magenta, and yellow colors in a source gamut into similar colors in a destination gamut by rotating the chroma components (Ct and Cp) in a constant intensity plane 1300. A hue rotation trajectory 1320 is depicted illustrating the rotation of the chroma components (Ct and Cp) in the constant intensity plane 1300 by mapping red, green, blue, cyan, magenta, and yellow colors in a source gamut into similar colors in a destination gamut such that all peaks of the source gamut shift to match the corresponding peaks of the destination gamut.

Chroma Mapping

After Inverse Tone Mapping (ITM) and Chroma Scaling (CS) stages, some processed pixels can move out of destination gamut, especially for larger values of chroma enhancement gain. To avoid chroma artifacts it is desirable to map these pixels onto boundary of destination gamut by the chroma mapping operation. A hue and intensity adaptive constant hue constant intensity (CHCI) operation is proposed for Chroma Mapping.

Figure 14:
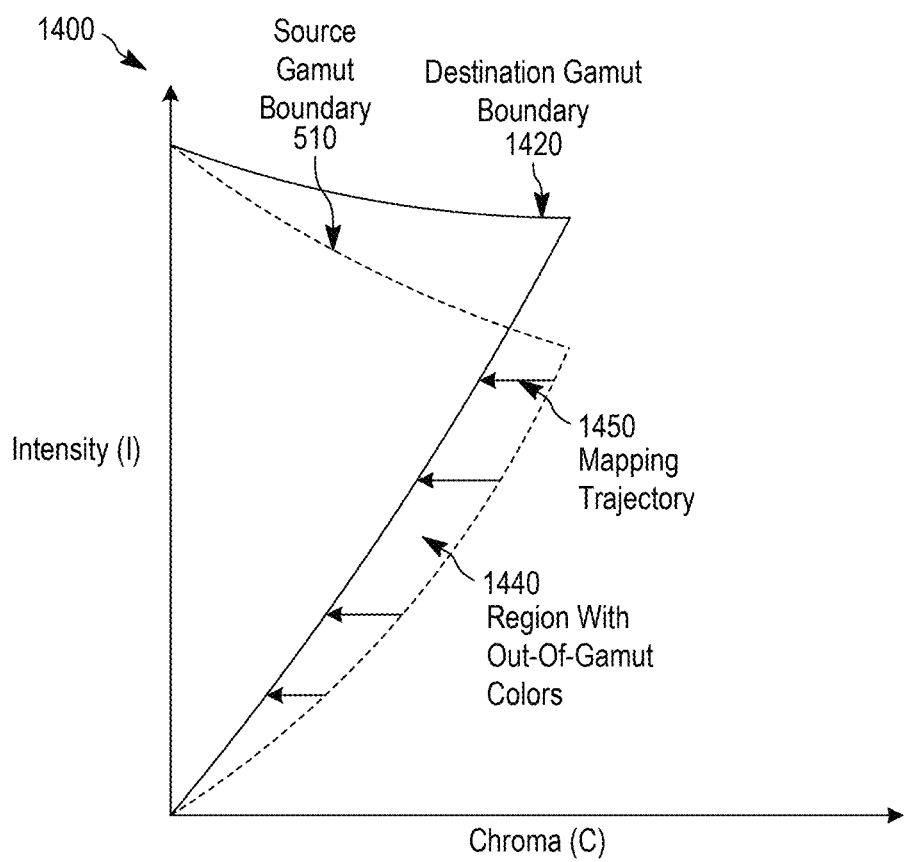
FIG. 14 sets forth a diagram of chroma mapping by constant hue constant intensity operation in accordance with some implementations of the present disclosure.

For further explanation, FIG. 14 sets forth a diagram 1400 of chroma mapping by constant hue constant intensity operation in accordance with some implementations of the present disclosure. The objective of CHCI operation is to continuously map source out-of-gamut colors onto destination gamut surface with avoiding false contours and details lost for bright colors. Due to preliminary Inverse Tone Mapping procedure, source and destination color spaces have the same minimum and maximum intensities.

For each constant hue, out-of-gamut chromas 1440 of the source gamut boundary 510 are mapped (having a mapping trajectory 1450) onto destination gamut boundary 1420 toward Intensity axis (parallel to chroma axis) as shown in FIG. 14. That is, the chroma mapping operation further includes applying a constant hue constant intensity mapping operation (e.g., the CHCI operation) to the scaled chroma components (Ct and Cp) of the pixel that maps in a constant hue plane all out of destination gamut chroma scaled source colors onto a destination gamut boundary surface along a constant intensity line.

The pixel's output coordinates ($I^{HDR}$ $C^{HDR}$) in constant hue plane are calculated from input pixel's coordinates ($I^{ITM}$, $C^{CS\_HR}$) after ITM, CS and HR operators as follows:

$$I^{HDR}=I^{TM}, C^{HDR}=\min(C^{CS\_HR},C_{dst}), \qquad (13)$$

where $C_{dst}$ is a chroma of destination gamut boundary for intensity $I^{ITM}$. Two segments intersection function and linear interpolation are used to find projection of source out-of-gamut pixels on the destination gamut surface represented by a gamut boundary descriptor. For increased accuracy, a gamut sampling procedure along the projection line can also be applied.

Inverse Chroma Mapping

In some implementations, inverse chroma mapping can be applied after ITM. Note that minimum and maximum intensities of tone mapped source and target gamut are the same. In some implementations, a constant hue variable origin (CHVO) operation with 2 zones (e.g., zone 1 and zone 2) can be used as Inverse Chroma Mapping.

Figure 15:
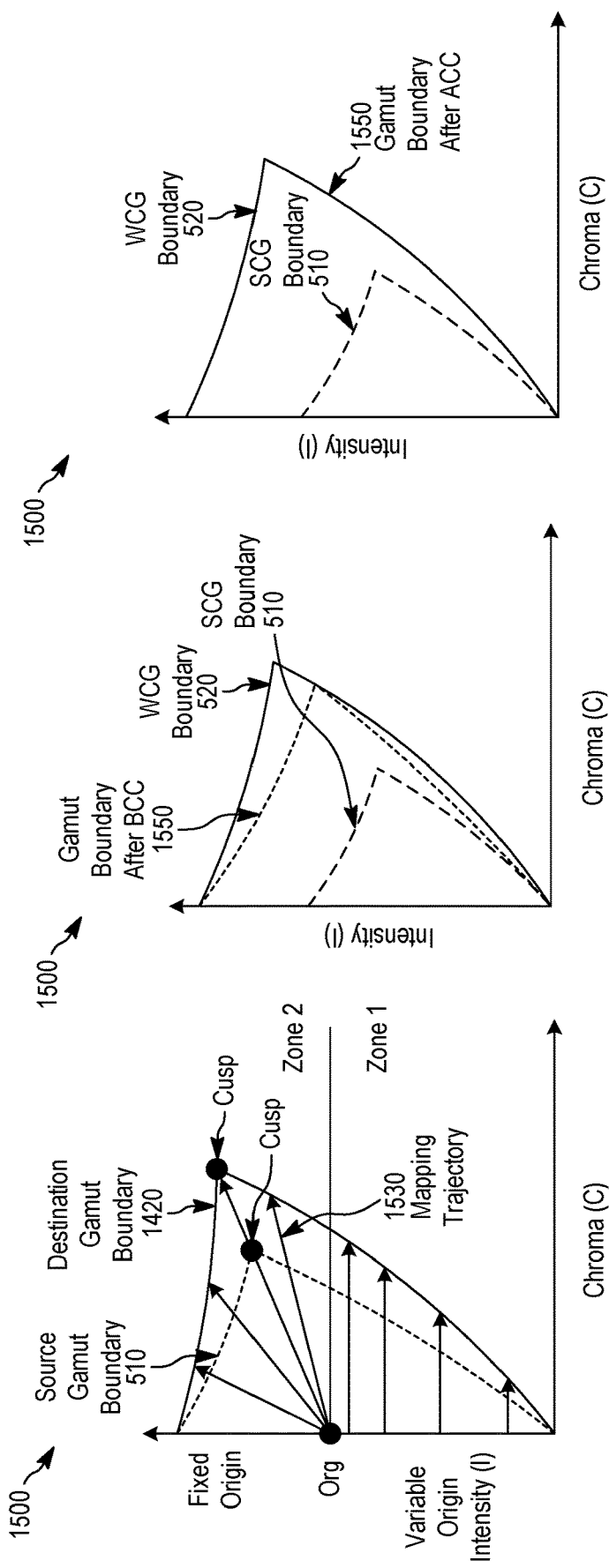
FIG. 15A sets forth a diagram of inverse chroma mapping by constant hue constant variable origin operation in accordance with some implementations of the present disclosure.
FIG. 15B sets forth a diagram of inverse gamut mapping using basic chroma correction, as depicted in FIG. 7, in accordance with some implementations of the present disclosure.
FIG. 15C sets forth a diagram of inverse gamut mapping using advanced chroma correction, as depicted in FIG. 8, in accordance with some implementations of the present disclosure.

For further explanation, FIG. 15A sets forth a diagram of inverse chroma mapping by constant hue variable origin operation in accordance with some implementations of the present disclosure. In some implementations, the inverse chroma mapping operation applies a constant hue variable origin operation to the transformed intensity (I) and the chroma components (Ct and Cp) of the pixel that maps (having a mapping trajectory 1530) in a constant hue plane all colors in source gamut (e.g., source boundary 510) into a destination gamut (e.g., destination gamut boundary 1420) along a constant intensity line for each of the colors having an intensity level less than an intersection of a line between a source cusp point and a destination cusp point with an intensity axis, and along lines originated from the intersection for each of the colors having an intensity level greater than the intersection.

The objectives of CHVO operation are to map source cusp points into destination cusp points to minimize "inversion" issues, and continuously map source colors into destination gamut with avoiding false contours and details lost for bright colors. Cusp points are the points with maximum chroma values in constant hue planes. Due to preliminary Inverse Tone Mapping procedure, source and destination color spaces have the same minimum and maximum intensities.

Mapping origin is variable for zone 1 (parallel to chroma axis) and fixed for zone 2. Point "org" is an intersection of a line coming through source cusp point (after tone mapping and hue rotation) and destination cusp point (cusp line) with Intensity axis. For some constant hues this point can have negative intensity value. Tuning parameter $P_{org}^{ICM}$ in a range [0.1, 0.5] with default value 0.25 does not allow this situation to happen:

$$I_{org}^{h}=\max(I_{\cap(cusp\ line",C=0)}^{h}, P_{org}^{ICM} \cdot I_{cusp}^{HDR}),$$
$$C_{org}^{h}=0. \qquad (14).$$

In some implementations, as illustrated in FIG. 15A, zone boundaries are formed by two cusps points. In each zone (e.g., zone 1 or zone 2), chromas in source gamut (e.g., source gamut boundary 510) are mapped into a destination gamut, differently. For zone 1, chromas can be scaled towards Intensity axis (parallel to Chroma axis). For zone 2, chromas can be scaled into destination gamut from ward "org" point.

In contrast to chroma mapping that maps only out-of-gamut pixels on destination gamut boundary, Inverse Chroma Mapping (ICM) maps all colors in source gamut towards destination gamut boundary. A scaling (stretching) factor for each pixel be determined such that the source gamut boundary 510 maps exactly onto destination gamut boundary 1420. A scaling factor is defined by a ratio of two segment's length in the Chroma-Intensity plane 1500. A first segment can be formed by "org" point and intersection of line between "org" and input pixel (after tome mapping and hue rotation) with source gamut boundary. The second segment can be formed by "org" point and intersection of line between "org" and input pixel (after tone mapping and hue rotation) with destination gamut boundary. Output pixel's coordinates ($I^{HDR}$, $C_T^{HDR}$, $C_P^{HDR}$) of a pixel after ITM and HR operators with coordinates ($I^{ITM}$, $C_T^{HR}$, $C_P^{HR}$) are determines as follows:

$$I^{HDR}=I^{ITM} \cdot S^{ICM}, C_T^{HDR}=C_T^{HR} \cdot S^{ICM},$$
$$C_P^{HDR}=C_P^{HR} \cdot S^{ICM}, \qquad (15),$$

where, $$S^{ICM} = \frac{R_{dst}}{R_{src}^{ITM\_HR}},$$

$$R_{src}^{ITM\_HR} = \sqrt{(I_{org} - I_{src}^{ITM})^2 + (C_{org} - C_{src}^{HR})^2}, \quad (16)$$

$$R_{dst} = \sqrt{(I_{org} - I_{dst})^2 + (C_{org} - C_{dst})^2},$$

$$R^{ITM\_HR} = \sqrt{(I_{org} - I^{ITM})^2 + (C_{org} - C^{HR})^2} .. \quad (17)$$

The ($I^{ITM}$, $C^{HR}$) are coordinates of input pixel in constant hue plane after ITM and HR operators. ($I_{org}$, $C_{org}$) are coordinates of "org" point in constant hue plane. ($I_{src}^{ITM}$, $C_{src}^{HR}$) are coordinates of intersection point between input pixel and source gamut boundary $\{T_{GBD}{}^h\}^{src}$ in constant hue plane after ITM and HR operators. ($I_{dst}$, $C_{dst}$) are coordinates of intersection point between input pixel and destination gamut $\{T_{GBD}{}^h\}^{dst}$ boundary constant hue plane. Two segments intersection function is used to find projection of mapped color on source and destination gamut boundaries.

For further explanation, FIG. 15B sets forth a diagram of inverse gamut mapping using basic chroma correction, as depicted in FIG. 7, in accordance with some implementations of the present disclosure. FIG. 15B demonstrates an example of how a boundary of source gamut SCG maps onto boundary of target gamut WCG in Chroma-Intensity plane 1500 for basic chroma correction (BCC) showing a gamut boundary 1550 after BCC, as described in FIG. 7.

FIG. 15C sets forth a diagram of inverse gamut mapping using advanced chroma correction, as depicted in FIG. 8, in accordance with some implementations of the present disclosure. That is, FIG. 15C demonstrates an example of mapping a boundary of source gamut SCG (e.g., source boundary 510) onto a boundary (e.g., WCG boundary 520) of a destination gamut WCG in Chroma-Intensity plane 1500 for advanced chroma correction (ACC) showing a gamut boundary 1550 after ACC, as described in FIG. 8. It should be noted that advanced chroma correction populates (fills) an entire/whole target gamut.

Figure 16:
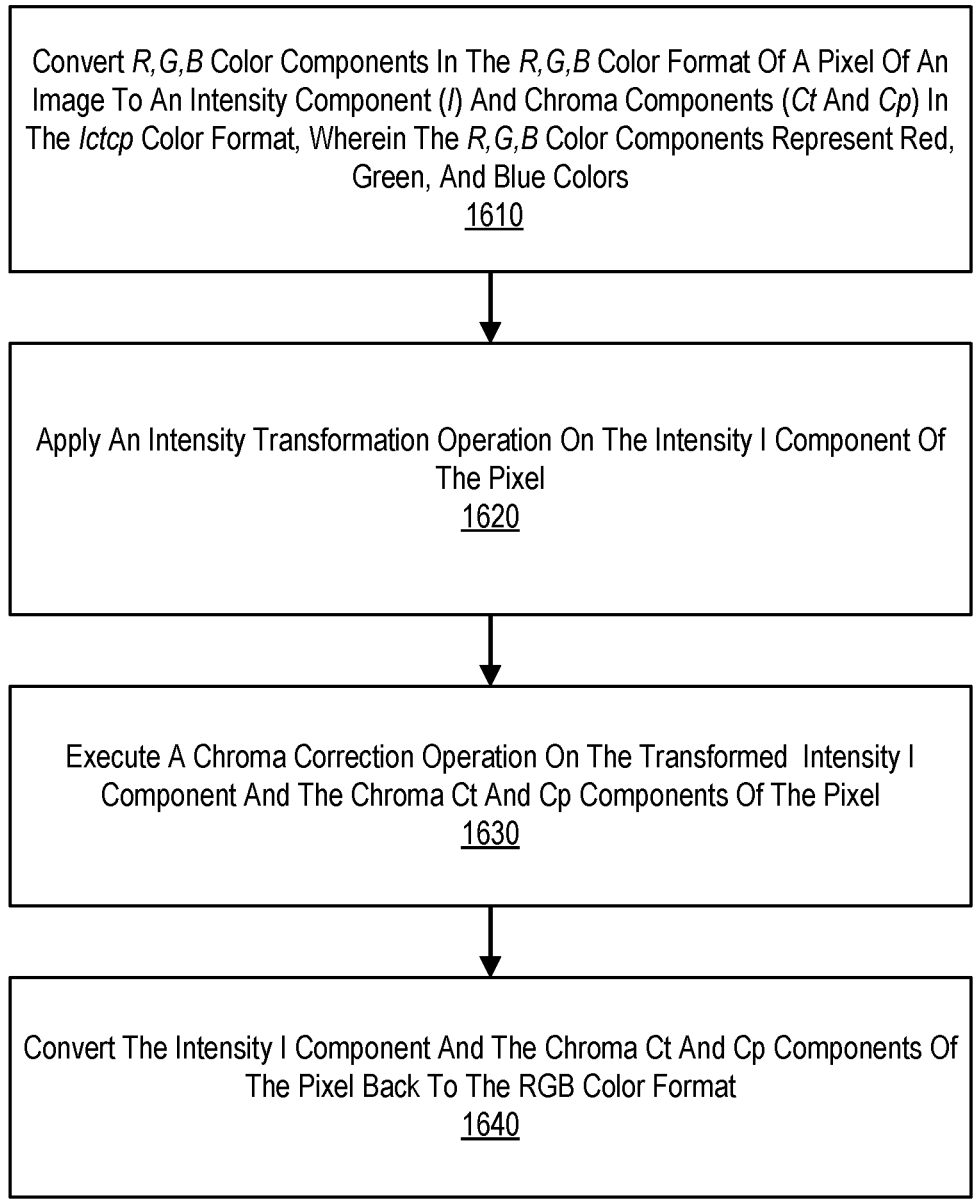
FIG. 16 sets forth a flow chart illustrating an example method of chroma correction of IGM for SDR to HDR image conversion in accordance with some implementations of the present disclosure.

For further explanation, FIG. 16 sets forth a flow chart illustrating an example method of chroma correction of IGM for SDR to HDR image conversion in accordance with some implementations of the present disclosure. The example method of FIG. 16 includes converting 1610 R,G,B color components in the R,G,B color format of a pixel to an intensity component (I) and chroma components (Ct and Cp) of an ICtCp color format, where the R,G,B color components represent red, green, and blue colors. Such a conversion 1610 of R,G,B components to I,Ct,Cp components can be carried out through derivations defined in Rec. ITU-R BT.2100.

The example method of FIG. 16 also includes applying 1620 an intensity transformation operation on the intensity component (I) of the pixel. In some implementations, the GPU 230, using the intensity transformation component 255, applies an intensity transformation operation on the intensity component (I) of the pixel, thereby transforming the intensity component (I). The intensity transformation operation 720 includes an Inverse Tone Mapping (ITM) operation with an incorporated Opto-Optical Transfer Function (OOTF) operation to enable a perception-based luminance transformation as described above.

The example method of FIG. 16 also includes executing 1630 a chroma correction operation on the transformed intensity component (I) and the chroma components (Ct and Cp) of the pixel. In some implementations, the GPU 230, using the chroma correction component 265 executes a chroma correction operation on the intensity component (I) and the chroma components (Ct and Cp) of the pixel to correct chroma components. The chroma correction operation includes chroma scaling, hue rotation, and chroma mapping as described above.

The example method of FIG. 16 also includes converting 1640 the intensity component (I) and the chroma components (Ct and Cp) of the pixel back to the RGB color format. In some implementations, the GPU 230, using the intensity transformation component 255 and the chroma correction component 265, converts the intensity component (I) and the chroma components (Ct and Cp) of the pixel back to the RGB color format. Converting 1640 the I, Ct, Cp components to R,G,B components can be carried out in an inverse manner to that of converting 1610 the R,G,B components to I,Ct,Cp components.

Figure 17:
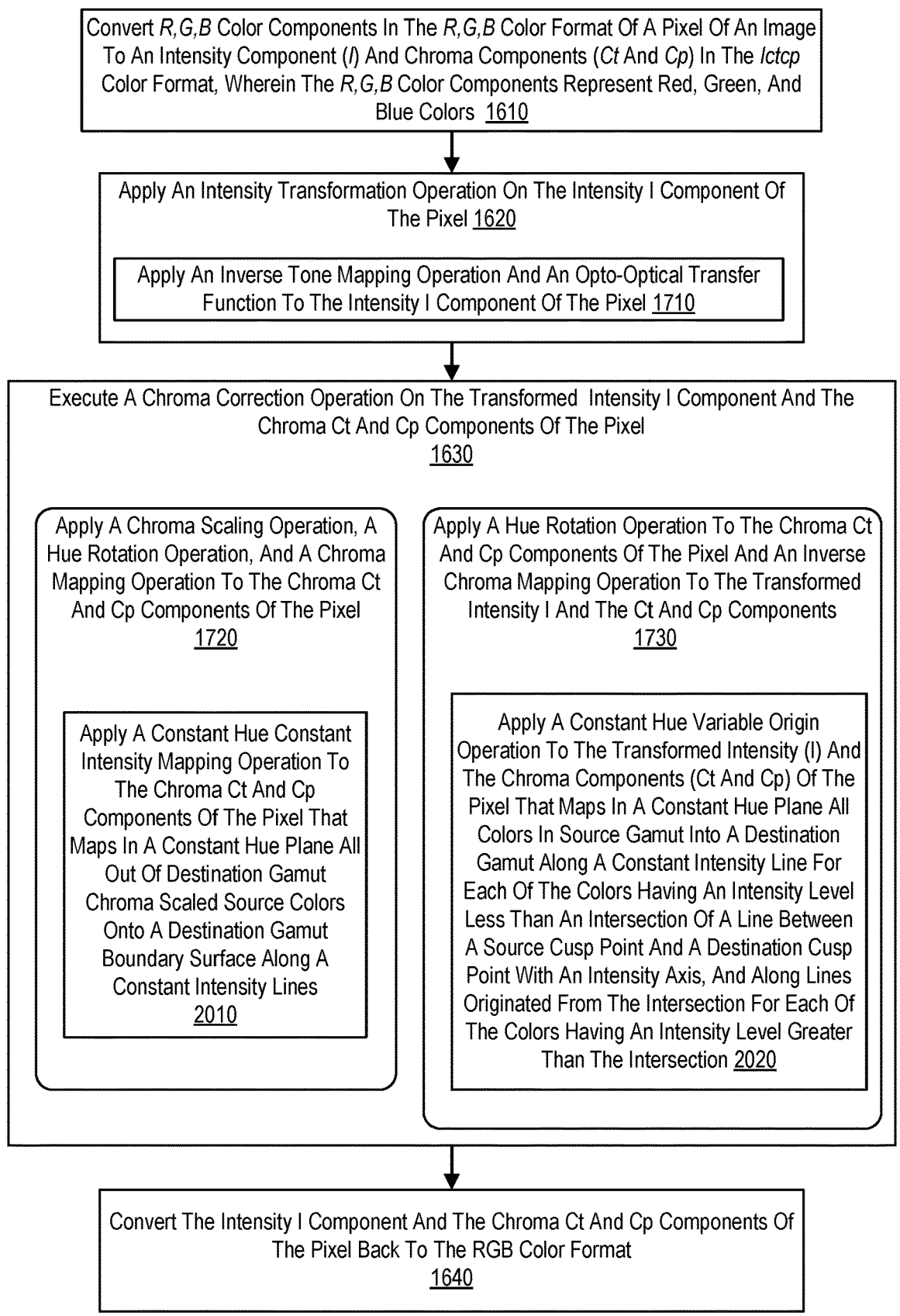
FIG. 17 sets forth a flow chart illustrating an additional example method of chroma correction of IGM for SDR to HDR image conversion in accordance with some implementations of the present disclosure.

For further explanation, FIG. 17 sets forth a flow chart illustrating an additional example method of chroma correction of IGM for SDR to HDR image conversion in accordance with some implementations of the present disclosure. The method of FIG. 17 differs from that of FIG. 16 in that the example method of FIG. 17 includes applying 1620 the intensity transformation operation includes applying 1710 an inverse tone mapping operation and an opto-optical transfer function to the intensity component (I) of the pixel. In some implementations, the GPU 230, using the intensity transformation component 255, applies the intensity transformation operation by applying an inverse tone mapping operation and an opto-optical transfer function to the intensity component (I) of the pixel. In some implementations, the intensity transformation operation includes performing the inverse tone mapping and then executing the Opto-Optical Transfer Function to transform the intensity component (I) of the pixel, as described in greater detail in FIG. 7.

Also set forth in the method of FIG. 17 are various implementations of executing 1630 a chroma correction operation. One implementation includes applying 1720 a chroma scaling operation, a hue rotation operation, and a chroma mapping operation to the chroma components (Ct and Cp) of the pixel. In some implementations, the GPU 230, using the chroma correction component 265 applies the chroma correction operation to produce HDR/WCG colors that are faithful to their SDR/SCG counterparts by applying chroma scaling followed by performing the hue rotation and chroma mapping operations, as described in greater detail in FIG. 7. In the method of FIG. 17, applying the chroma mapping operation includes applying 2010 a constant hue constant intensity mapping operation to the chroma components (Ct and Cp) of the pixel that maps in a constant hue plane all out of destination gamut chroma scaled source colors onto a destination gamut boundary surface along a constant intensity line.

In another implementation, executing 1630 the chroma correction operation includes applying 1730 a hue rotation operation to the chroma components (Ct and Cp) of the pixel and an inverse chroma mapping operation to the transformed intensity component (I) and the Ct and Cp components. In some implementations, the GPU 230, using the chroma correction component 265, applies the chroma correction operation to produce colorfulness enhanced HDR/WCG colors by applying the hue rotation and inverse chroma mapping operations, as described in greater detail in both FIG. 8.

In the method of FIG. 17, applying the inverse chroma mapping operation includes applying 2020 a constant hue variable origin operation to the transformed intensity (I) and the chroma components (Ct and Cp) of the pixel that maps in a constant hue plane all colors in source gamut into a destination gamut along a constant intensity line for each of the colors having an intensity level less than an intersection of a line between a source cusp point and a destination cusp point with an intensity axis, and along lines originated from the intersection for each of the colors having an intensity level greater than the intersection. In some implementations, the GPU 230, using the chroma correction component 265, continuously maps, in a constant hue plane, a source out-of-gamut colors onto destination gamut surface along constant intensity lines using the constant hue constant intensity operation of the chroma mapping operation, as described in greater detail in FIG. 14.

For further explanation, FIG. 18 sets forth a flow chart illustrating an additional example method of chroma correction of IGM for SDR to HDR image conversion in accordance with some implementations of the present disclosure. In the example of FIG. 18, executing 1630 the chroma correction also includes generating 1810 a gamut boundary descriptor using an inverse gamut sampling operation in a constant hue plane by predicting a gamut boundary point for an elevation angle from radiuses of a plurality of gamut boundary points for a plurality of previously estimated elevation angles, or refining the gamut boundary point along a radius from a middle point between maximum and minimum intensities to the predicted point in the constant hue plane based upon testing the gamut boundary point in R,G,B color coordinates.

In some implementations, the GPU 230, using the chroma correction component 265, generates a gamut boundary descriptor for each constant hue plain. The gamut boundary descriptor consists of a prediction of a boundary point for a current elevation angle. The current elevation angle is defined from radii of boundary points of two previously estimated elevation angles followed by the boundary point refinement along a line (radius) from an intensity middle/center point by testing validity of the point in R'G'B' color coordinates, as described in greater details in FIG. 9.

For further explanation, FIG. 19 sets forth a flow chart illustrating an additional example method of chroma correction of IGM for SDR to HDR image conversion in accordance with some implementations of the present disclosure. In the method of FIG. 19, executing 1630 the chroma correction operation includes applying 1910 a hue rotation operation to the chroma components (Ct and Cp) of the pixel that maps red, green, blue, cyan, magenta, and yellow colors in a source gamut into similar colors in a destination gamut by rotating the chroma components (Ct and Cp) in a constant intensity plane. In some implementations, the GPU 230, using the chroma correction component 265, applies a constant hue constant intensity mapping operation to the scaled chroma components (Ct and Cp) of the pixel that maps, in a constant hue plane, destination gamut chroma scaled source colors onto a destination gamut boundary surface along a constant intensity line. Said differently, the GPU 230, using the chroma correction component 265, uses/applies primary and secondary (cusp) colors of a source gamut to corresponding primary and secondary (cusp) colors of a destination gamut by rotation chroma components in constant intensity plain, as described in greater detail in FIG. 13.

In the example of FIG. 19, applying 1910 the hue rotation operation includes applying 1920 a constant hue variable origin operation to the transformed intensity (I) and the chroma components (Ct and Cp) of the pixel that maps in a constant hue plane all colors in source gamut into a destination gamut along a constant intensity line for each of the colors having an intensity level less than an intersection of a line between a source cusp point and a destination cusp point with an intensity axis, and along lines originated from the intersection for each of the colors having an intensity level greater than the intersection.

In some implementations, the GPU 230, using the chroma correction component 265, continuously maps, in a constant hue plane, source colors into destination gamut along constant intensity lines for colors with intensity less than intersection of line between source and destination cusp points and intensity axis (zone 1), and along lines originated from this intersection for other colors (zone 2) for constant hue variable origin operation with two zones of Inverse Chroma Mapping operation constant hue variable origin operation with two zones of Inverse Chroma Mapping operation, as described in greater detail in FIG. 15A.

In view of the foregoing, readers of skill in the art will appreciate that implementations in accordance with the present disclosure offer a number of advantages. Implementations provide applications or operations of an image capturing devices to execute a pre-processing operation in an image feature domain to eliminate the need for per-pixel gain compensation and offline calibration of gain compensation. In this way, the user experience is improved.

Some implementations can be a system, an apparatus, a method, and/or logic circuitry. Computer readable program instructions in the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some implementations, electronic circuitry including, for example, programmable logic circuitry, field-programmable gate arrays (FPGA), or programmable logic arrays (PLA) executes the computer readable program instructions by utilizing state information of the computer readable program instructions.

Aspects of the present disclosure are described herein with reference to flowchart illustrations and/or block diagrams of methods, apparatus (systems), and logic circuitry according to some implementations of the disclosure. It will be understood that each block of the flowchart illustrations and/or block diagrams, and combinations of blocks in the flowchart illustrations and/or block diagrams, can be implemented by logic circuitry.

The logic circuitry can be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and logic circuitry according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to implementations thereof, it will be understood that various changes in form and details can be made therein without departing from the spirit and scope of the following. Therefore, the implementations described herein should be considered in a descriptive sense only and not for purposes of limitation. The present disclosure is defined not by the detailed description but by the appended claims, and all differences within the scope will be construed as being included in the present disclosure.

What is claimed is:

1. A method of chroma correction of inverse gamut mapping (IGM) for standard dynamic range (SDR) to high dynamic range (HDR) image conversion, the method comprising:
   converting R,G,B color components in RGB color format of a pixel of an image to an intensity component (I) and chroma components (Ct and Cp) in an ICtCp color format, wherein the R,G,B color components represent red, green, and blue colors;
   applying an intensity transformation operation on the intensity component (I) of the pixel, the intensity transformation operation including applying an inverse tone mapping operation and an opto-optical transfer function to the intensity component (I) of the pixel;
   executing, after applying the inverse tone mapping operation and the opto-optical transfer function to the intensity component (I) of the pixel, a chroma correction operation on the transformed intensity component (I) and the chroma components (Ct and Cp) of the pixel including a hue rotation operation; and
   converting the intensity component (I) and the chroma components (Ct and Cp) of the pixel back to the RGB color format.

2. The method of claim 1, wherein applying the chroma correction operation to the intensity component (I) and the chroma components (Ct and Cp) includes applying a chroma scaling operation, the hue rotation operation, and a chroma mapping operation to the chroma components (Ct and Cp) of the pixel.

3. The method of claim 2, wherein applying the chroma mapping operation further includes applying a constant hue constant intensity mapping operation to the chroma components (Ct and Cp) of the pixel that maps in a constant hue plane all out of destination gamut chroma scaled source colors onto a destination gamut boundary surface along a constant intensity line.

4. The method of claim 1, wherein applying the chroma correction operation further includes applying the hue rotation operation to the chroma components (Ct and Cp) of the pixel and an inverse chroma mapping operation to the transformed intensity (I) and the rotated chroma components (Ct and Cp).

5. The method of claim 4, wherein applying the inverse chroma mapping operation further includes applying a constant hue variable origin operation to the transformed intensity (I) and the chroma components (Ct and Cp) of the pixel that maps in a constant hue plane all colors in source gamut into a destination gamut along a constant intensity line for each of the colors having an intensity level less than an intersection of a line between a source cusp point and a destination cusp point with an intensity axis, and along lines originated from the intersection for each of the colors having an intensity level greater than the intersection.

6. The method of claim 1, wherein applying the chroma correction operation further includes generating a gamut boundary descriptor using an inverse gamut sampling operation in a constant hue plane by:
   predicting a gamut boundary point for an elevation angle from radiuses of a plurality of gamut boundary points for a plurality of previously estimated elevation angles; and
   refining the gamut boundary point along a radius from a middle point between maximum and minimum intensities to the predicted point in the constant hue plane based upon testing the gamut boundary point in R,G,B color coordinates.

7. The method of claim 1, wherein applying the chroma correction operation further includes applying the hue rotation operation to the chroma components (Ct and Cp) of the pixel that maps red, green, blue, cyan, magenta, and yellow colors in a source gamut into similar colors in a destination gamut by rotating the chroma components (Ct and Cp) in a constant intensity plane.

8. An apparatus for providing chroma correction of inverse gamut mapping (IGM) for standard dynamic range (SDR) image with standard color gamut (SCG) to high dynamic range (HDR) image with wide color gamut (WCG) conversion for each pixel in an image in RGB color format, the apparatus comprising a computer processor, a computer memory operatively coupled to the computer processor, the computer memory having disposed therein computer program instructions that, when executed by the computer processor, cause the apparatus to:
   convert R, G,B color components in the RGB color format of a pixel to an intensity component (I) and chroma components (Ct and Cp) in ICtCp color format, wherein the R,G,B color components represent red, green, and blue colors; apply an intensity transformation operation on the intensity component (I) of the pixel, the intensity transformation operation including applying an inverse tone mapping operation and an opto-optical transfer function to the intensity component (I) of the pixel;
   execute, after applying the inverse tone mapping operation and the opto-optical transfer function to the intensity component (I) of the pixel, a chroma correction operation on the transformed intensity component (I) and the chroma components (Ct and Cp) of the pixel including a hue rotation operation; and
   convert the intensity component (I) and the chroma components (Ct and Cp) of the pixel back to the RGB color format.

9. The apparatus of claim 8, wherein applying the chroma correction operation to the intensity component (I) and the chroma components (Ct and Cp) includes applying a chroma scaling operation, the hue rotation operation, and a chroma mapping operation to the chroma components (Ct and Cp) of the pixel.

10. The apparatus of claim 8, wherein applying the chroma correction operation includes applying the hue rotation operation to the chroma components (Ct and Cp) of the pixel and an inverse chroma mapping operation to the transformed intensity (I) and the rotated chroma components (Ct and Cp).

11. The apparatus of claim 8, wherein applying the chroma correction operation further includes generating a gamut boundary descriptor using an inverse gamut sampling operation in a constant hue plane by:
predicting a gamut boundary point for an elevation angle from radiuses of a plurality of gamut boundary points for a plurality of previously estimated elevation angles; and
refining the gamut boundary point along a radius from a middle point between maximum and minimum intensities to the predicted point in the constant hue plane based upon testing the gamut boundary point in R,G,B color coordinates.

12. The apparatus of claim 8, wherein applying the chroma correction operation to the intensity component (I) and the chroma components (Ct and Cp) further includes applying the hue rotation operation that maps one or more primary colors and secondary colors of a source gamut to a destination gamut by rotating the chroma components (Ct and Cp) in a constant intensity plane.

13. The apparatus of claim 9, wherein applying the chroma mapping operation further includes applying a constant hue constant intensity operation that maps in a constant hue plane one or more out-of-gamut source colors onto a destination gamut surface along a constant intensity line.

14. The apparatus of claim 10, wherein applying the inverse chroma mapping operation further includes applying a constant hue variable origin to the transformed intensity (I) and the chroma components (Ct and Cp) of the pixel that maps in a constant hue plane one or more source colors onto a destination gamut surface along a constant intensity line for colors having an intensity level less than an intersection of a line between a source cusp point and a destination cusp point and intensity axis in a first zone and along intensity lines originated from the intersection for each of the colors having an intensity level greater than the intersection.

15. A computer program product for providing chroma correction of inverse gamut mapping (IGM) for standard dynamic range (SDR) image with standard color gamut (SCG) to high dynamic range (HDR) image with wide color gamut (WCG) conversion for each pixel in an image in RGB color format, the computer program product disposed upon a non-transitory computer readable medium, the computer program product comprising computer program instructions that, when executed, cause a computer to:
convert R, G,B color components in the RGB color format of a pixel to an intensity component (I) and chroma components (Ct and Cp) in ICtCp color format, wherein the R,G,B color components represent red, green, and blue colors;
apply an intensity transformation operation on the intensity component (I) of the pixel, the intensity transformation operation including applying an inverse tone mapping operation and an opto-optical transfer function to the intensity component (I) of the pixel;
execute, after applying the inverse tone mapping operation and the opto-optical transfer function to the intensity component (I) of the pixel, a chroma correction operation on the transformed intensity component (I) and the chroma components (Ct and Cp) of the pixel including a hue rotation operation; and
convert the intensity component (I) and the chroma components (Ct and Cp) of the pixel back to the RGB color format.

16. The computer program product of claim 15, wherein applying the chroma correction operation to the intensity component (I) and the chroma components (Ct and Cp) includes applying a chroma scaling operation, the hue rotation operation, and a chroma mapping operation to the chroma components (Ct and Cp) of the pixel.

17. The computer program product of claim 15, wherein applying the chroma correction operation to the intensity component (I) and the chroma components (Ct and Cp) includes applying the hue rotation operation and an inverse chroma mapping operation, wherein applying the inverse chroma mapping operation further includes applying a constant hue variable origin operation.

18. The computer program product of claim 15, wherein applying the chroma correction operation further includes:
applying the hue rotation operation to the chroma components (Ct and Cp) of the pixel that maps red, green, blue, cyan, magenta, and yellow colors in a source gamut into similar colors in a destination gamut by rotating the chroma components (Ct and Cp) in a constant intensity plane; and
generating a gamut boundary descriptor using an inverse gamut sampling operation in a constant hue plane by:
predicting a gamut boundary point for an elevation angle from radiuses of a plurality of gamut boundary points for a plurality of previously estimated elevation angles; and
refining the gamut boundary point along a radius from a middle point between maximum and minimum intensities to the predicted point in the constant hue plane based upon testing the gamut boundary point in R,G,B color coordinates.

19. The computer program product of claim 16, wherein applying the chroma mapping operation further includes applying a constant hue constant intensity mapping operation to the chroma components (Ct and Cp) of the pixel that maps in a constant hue plane all out of destination gamut chroma scaled source colors onto a destination gamut boundary surface along a constant intensity line.

20. The computer program product of claim 17, wherein applying the inverse chroma mapping operation further includes applying a constant hue variable origin operation to the transformed intensity (I) and the chroma components (Ct and Cp) of the pixel that maps in a constant hue plane all colors in source gamut into a destination gamut along a constant intensity line for each of the colors having an intensity level less than an intersection of a line between a source cusp point and a destination cusp point with an intensity axis, and along lines originated from the intersection for each of the colors having an intensity level greater than the intersection.

* * * * *